(12) United States Patent
Maday

(10) Patent No.: US 12,498,700 B2
(45) Date of Patent: Dec. 16, 2025

(54) TIME SERIES ANOMALY DETECTION IN INTEGRATED CIRCUIT (IC) FABRICATION ENVIRONMENT

(71) Applicant: TEXAS INSTRUMENTS INCORPORATED, Dallas, TX (US)

(72) Inventor: Lyubima Maday, Herriman, UT (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 330 days.

(21) Appl. No.: 18/309,778

(22) Filed: Apr. 29, 2023

(65) Prior Publication Data
US 2024/0329622 A1    Oct. 3, 2024

Related U.S. Application Data

(60) Provisional application No. 63/493,610, filed on Mar. 31, 2023.

(51) Int. Cl.
| | | |
|---|---|---|
| *G05B 19/4099* | (2006.01) | |
| *G01N 21/95* | (2006.01) | |
| *G06N 3/0455* | (2023.01) | |
| *G06T 7/00* | (2017.01) | |
| *G06T 9/00* | (2006.01) | |

(52) U.S. Cl.
CPC ....... *G05B 19/4099* (2013.01); *G06N 3/0455* (2023.01); *G01N 21/9501* (2013.01); *G05B 2219/45031* (2013.01); *G06T 7/0004* (2013.01); *G06T 9/002* (2013.01)

(58) Field of Classification Search
CPC ... G06T 7/0004; G06T 9/002; G01N 21/9501; G06N 3/04; G06N 3/045; G06N 3/0455; G05B 19/4099

USPC .......................................................... 700/121
See application file for complete search history.

(56) References Cited

U.S. PATENT DOCUMENTS

| | | | |
|---|---|---|---|
| 11,120,127 B2 | 9/2021 | Niculescu-Mizil et al. | |
| 11,509,918 B2 * | 11/2022 | Kurokawa | H03K 3/3562 |

FOREIGN PATENT DOCUMENTS

| | | | | |
|---|---|---|---|---|
| TW | I829875 B * | 1/2024 | | G06T 9/002 |
| WO | WO-2022140097 A1 * | 6/2022 | | G06N 20/20 |

OTHER PUBLICATIONS

M. Breunig, et al., "LOF: identifying density-based local outliers," SIGMOD Rec. 29, 2 (Jun. 2000), pp. 93-104.
F. T. Liu, et al., "Isolation Forest," 2008 Eighth IEEE International Conference on Data Mining, Pisa, Italy, 2008, pp. 413-422.

* cited by examiner

*Primary Examiner* — Ronald D Hartman, Jr.
(74) *Attorney, Agent, or Firm* — Andrew R. Ralston; Frank D. Cimino

(57) ABSTRACT

An IC manufacturing system including an anomaly detection and classification engine including a trained convolutional autoencoder (CAE) module coupled to a pointwise outlier detector (POD) module that is fitted to a latent feature space associated with the trained CAE module. The trained CAE module is operable to encode a candidate time series signal into a compressed representation in the latent feature space. The POD module is operable to determine the number of compressed datapoints of the compressed representation predicted to be outliers, which may be used in classifying whether the candidate time series signal is an anomalous signal.

18 Claims, 16 Drawing Sheets

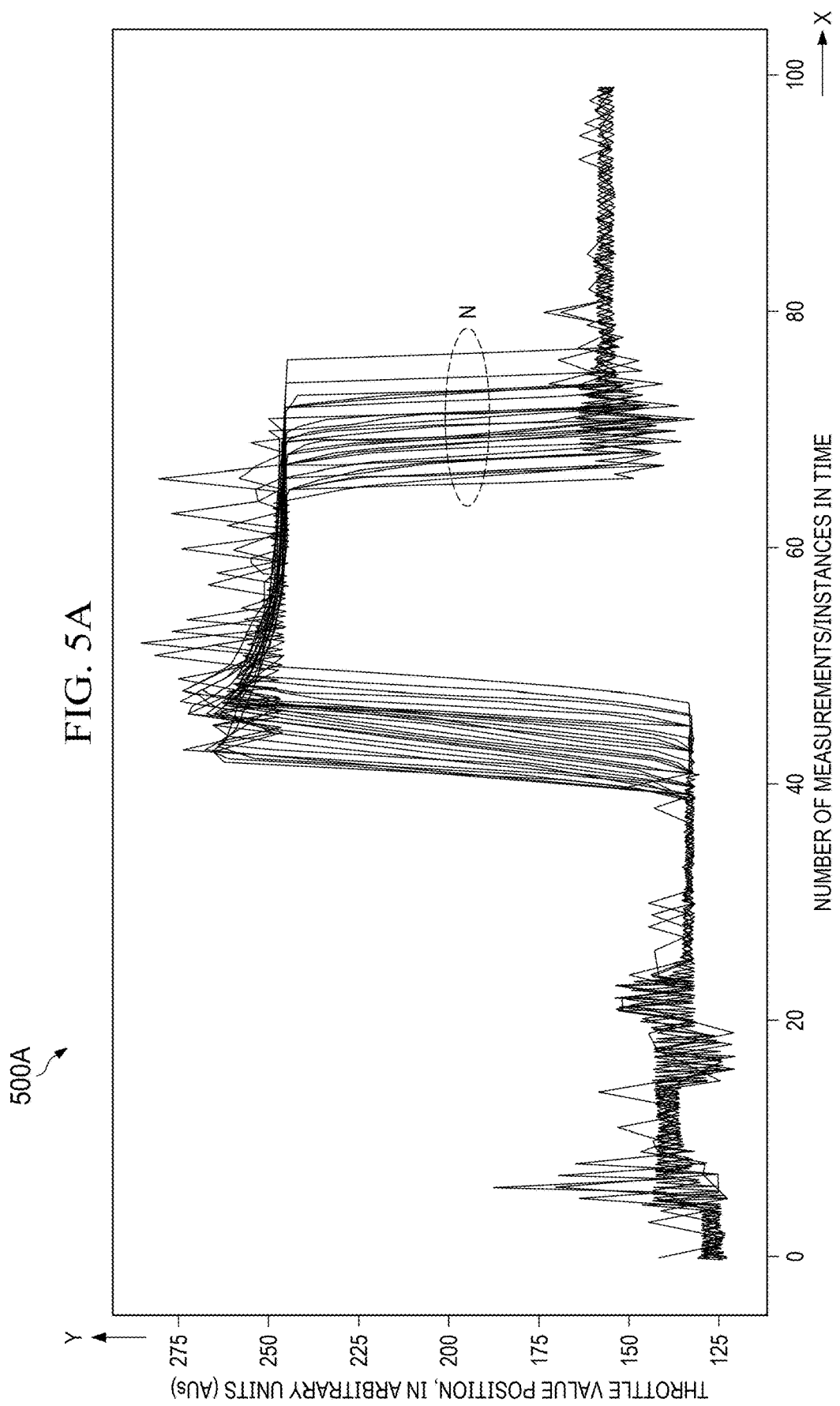

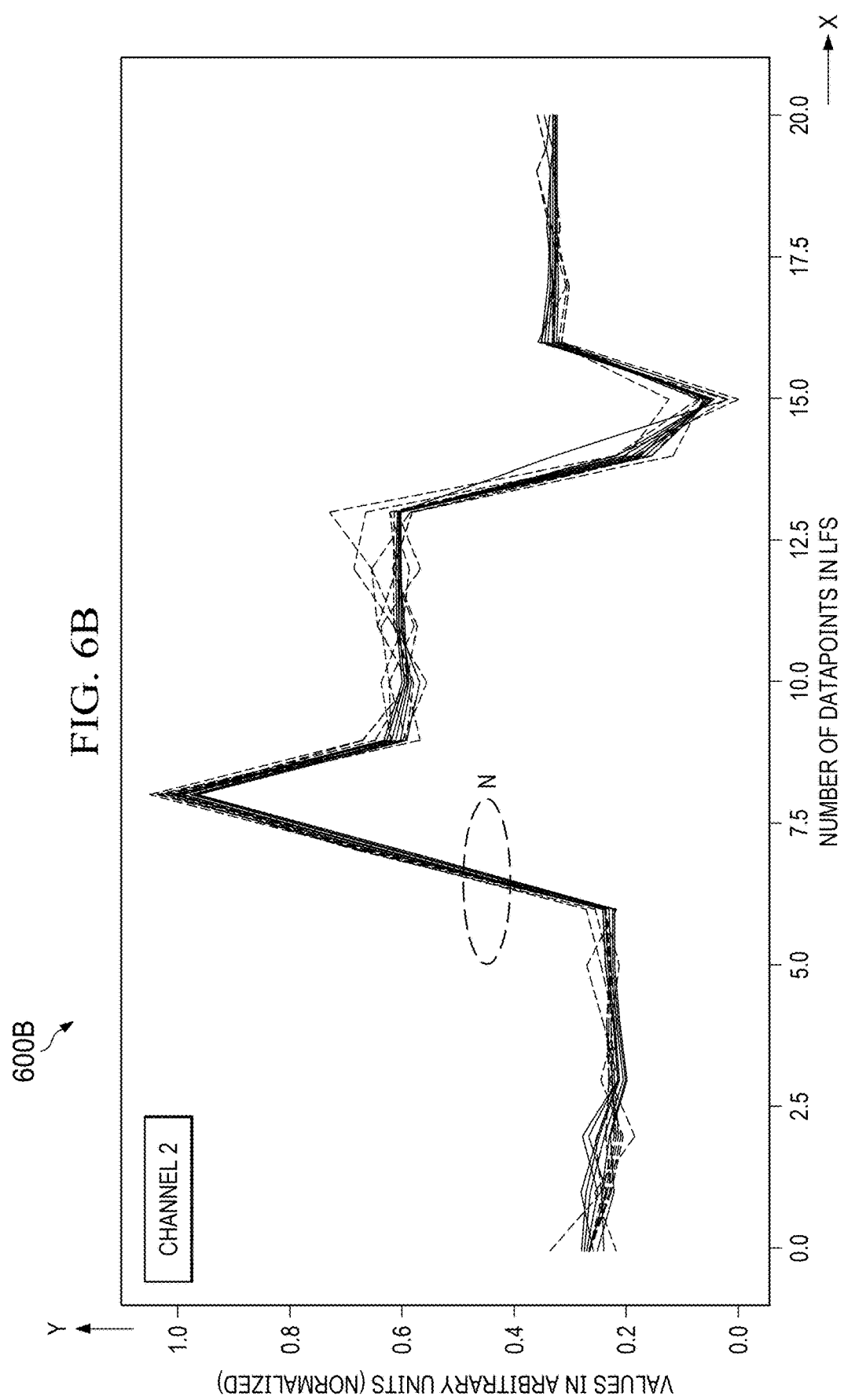

TIME SERIES ANOMALY DETECTION IN INTEGRATED CIRCUIT (IC) FABRICATION ENVIRONMENT

CROSS-REFERENCE TO RELATED APPLICATIONS

This non-provisional application claims priority based upon U.S. provisional Application No. 63/493,610, filed Mar. 31, 2023, which is hereby incorporated by reference in its entirety.

FIELD OF THE DISCLOSURE

Disclosed implementations relate generally to the field of semiconductor manufacturing.

BACKGROUND

Within the semiconductor industry, there is a constant demand for integrated circuits (ICs) that exhibit higher performance at a lower cost. In order to design and manufacture high performance ICs cost-effectively, several parameters associated with a manufacturing process, e.g., including tool settings, etc., need to be monitored and carefully controlled. Increasing complexity of manufacturing and the need to correct issues in real time requires that actionable information is readily available regardless of the type of tooling and process flows deployed in a facility.

SUMMARY

The following presents a simplified summary in order to provide a basic understanding of some examples of the present disclosure. This summary is not an extensive overview of the examples, and is neither intended to identify key or critical elements of the examples, nor to delineate the scope thereof. Rather, a primary purpose of the summary is to present some concepts of the present disclosure in a simplified form as a prelude to a more detailed description that is presented in subsequent sections further below.

Some examples of the present disclosure are directed to an IC manufacturing system including an anomaly detection and classification (ADC) engine comprising a trained convolutional autoencoder (CAE) module coupled to a point-wise outlier detector (POD) module that is fitted to a latent feature space associated with the trained CAE module. Depending on implementation, various types of tool trace data as well as inline response metrics data relative to one or more process stages and associated tooling equipment may be monitored for purposes of some examples herein. In some arrangements, the trained CAE module is operable to encode a candidate time series signal into a compressed representation in the latent feature space, wherein the candidate time series signal may comprise tool trace data obtained during processing of the semiconductor wafer. In some arrangements, the POD module is operable to determine the number of compressed datapoints of the compressed representation predicted to be outliers, which may be used in classifying whether the candidate time series signal is an anomalous signal.

In one example, a method of fabricating an IC is disclosed. The method may comprise configuring a CAE engine based on trace data relative to a tool parameter of a fabrication tool deployed at a targeted process step for processing semiconductor wafers, wherein the trace data may comprise a dataset of one or more time series signals associated with the tool parameter. The method may comprise obtaining a candidate time series signal from the fabrication tool for anomaly detection and classification. In one arrangement, the candidate time series signal may comprise datapoints measured or otherwise obtained relative to the tool parameter during processing of at least one semiconductor wafer by the fabrication tool. The method may comprise determining, using the CAE engine, a compressed representation of the candidate time series signal in a latent feature space comprising one or more channels, wherein the compressed representation may have a plurality of compressed datapoints fewer than the datapoints in the candidate time series signal. The method may comprise identifying the candidate time series signal as an anomalous signal, for example, on the condition that a quantity associated with the compressed datapoints in the latent feature space determined to be outliers is greater than a first threshold. In some arrangements, the method may comprise actuating, responsive to the identifying, an out-of-control action plan (OCAP) module configured to determine a disposition action. In some arrangements, the method may comprise adjusting at least one of a tool setting relative to the tool parameter of the fabrication tool and a process parameter of the targeted process step in response to the disposition action. In some arrangements, the method may comprise processing a subsequent semiconductor wafer at the targeted process step, the subsequent semiconductor wafer containing the IC at an intermediate stage of formation. In some arrangements, the method may comprise determining whether a compressed datapoint is an outlier based on a POD engine fitted to a plurality of training time series signals compressed in the latent feature space. In some arrangements, the method may comprise preprocessing the plurality of training data signals and/or the candidate time series signal to obtain alignment of the time series signals based on an index before processing by the CAE engine.

In one example, a semiconductor fabrication tool is disclosed. The fabrication tool may comprise a housing, manufacturing stage, enclosure, receptacle, or a chamber, etc., configured to receive an integrated circuit at an intermediate stage of formation, and an anomaly detection and classification (ADC) module operably associated with the manufacturing stage, wherein the ADC module includes a processor and a persistent memory having executable program instructions configured to perform following acts when executed by the processor. In one arrangement, the program instructions may include instructions for training a CAE engine based on trace data relative to a tool parameter of the semiconductor fabrication too (e.g., data generated by a sensor associated therewith), wherein the trace data comprises a plurality of time series signals corresponding to the tool parameter, the CAE engine including a latent feature space corresponding to a compressed representation of the trace data. The program instructions may include instructions for training a POD module fitted to the latent feature space associated with the CAE module. The program instructions may further include instructions for classifying a candidate time series signal as an anomalous signal responsive to an outlier determination from the POD module with respect to the candidate time series signal, wherein the candidate time series signal is operable to be generated by the fabrication tool, e.g., via one or more sensors. In some example arrangements, the semiconductor fabrication tool may further include a data preprocessing module configured to remove translations in the trace data and/or the candidate time series signal. In some example arrangements, the semiconductor fabrication tool may further comprise an input data quality module configured to ensure an acceptable quality of the trace data and/or the candidate time series signal. In some example arrangements, the POD module of a semiconductor fabrication tool may comprise a Local Outlier Factor (LOF) module, an Isolation Forest (IF) module, or both. In some example arrangements, the semiconductor fabrication tool may comprise an alarm generator for triggering an out-of-control action plan (OCAP) module in response to identifying the anomalous signal. In some example arrangements, the program instructions of a semiconductor fabrication tool may further comprise instructions configured to classify a candidate time series signal at different levels of anomalousness based on a plurality of configurable thresholds depending on implementation.

In another example, an IC is disclosed, which may comprise, inter alia, a material layer formed over a semiconductor wafer at a targeted process step of a fabrication flow using a fabrication tool, the semiconductor wafer forming a substrate for the IC. In one arrangement, the material layer may be reworked responsive to determining that a candidate time series signal associated with the fabrication tool is identified as an anomalous signal by a trained CAE module coupled to a POD module that is fitted to a latent feature space associated with the trained CAE module. In some examples, the candidate time series signal may comprise trace data from the fabrication tool obtained over a configurable time period, e.g., during processing of the semiconductor wafer.

In further examples, an apparatus, a system, or a network node including an ADC engine based on a computer platform is disclosed, wherein the computer platform may be configured to execute a plurality of program instructions for effectuating one or more methods and/or modules set forth herein.

BRIEF DESCRIPTION OF THE DRAWINGS

Implementations of the present disclosure are illustrated by way of example, and not by way of limitation, in the Figures of the accompanying drawings. It should be noted that different references to "an" or "one" implementation in this disclosure are not necessarily to the same implementation, and such references may mean at least one. Further, when a particular feature, structure, or characteristic is described in connection with an implementation, it is submitted that it is within the knowledge of one skilled in the art to effect such feature, structure, or characteristic in connection with other implementations whether or not explicitly described.

The accompanying drawings are incorporated into and form a part of the specification to illustrate one or more example implementations of the present disclosure. Various advantages and features of the disclosure will be understood from the following Detailed Description taken in connection with the appended claims and with reference to the attached drawing Figures in which:

FIGS. 5A and 5B depict a plurality of time series observations relating to a tool setting of a plasma etch tool, e.g., throttle valve position, that may be analyzed for anomaly detection and classification using an ADC engine in an example application scenario;

FIGS. 6A-6C depict compressed representations corresponding to the plurality of time series observations decomposed into three channels, respectively, in the example application scenario of FIG. 5A;

DETAILED DESCRIPTION

Figure 1:
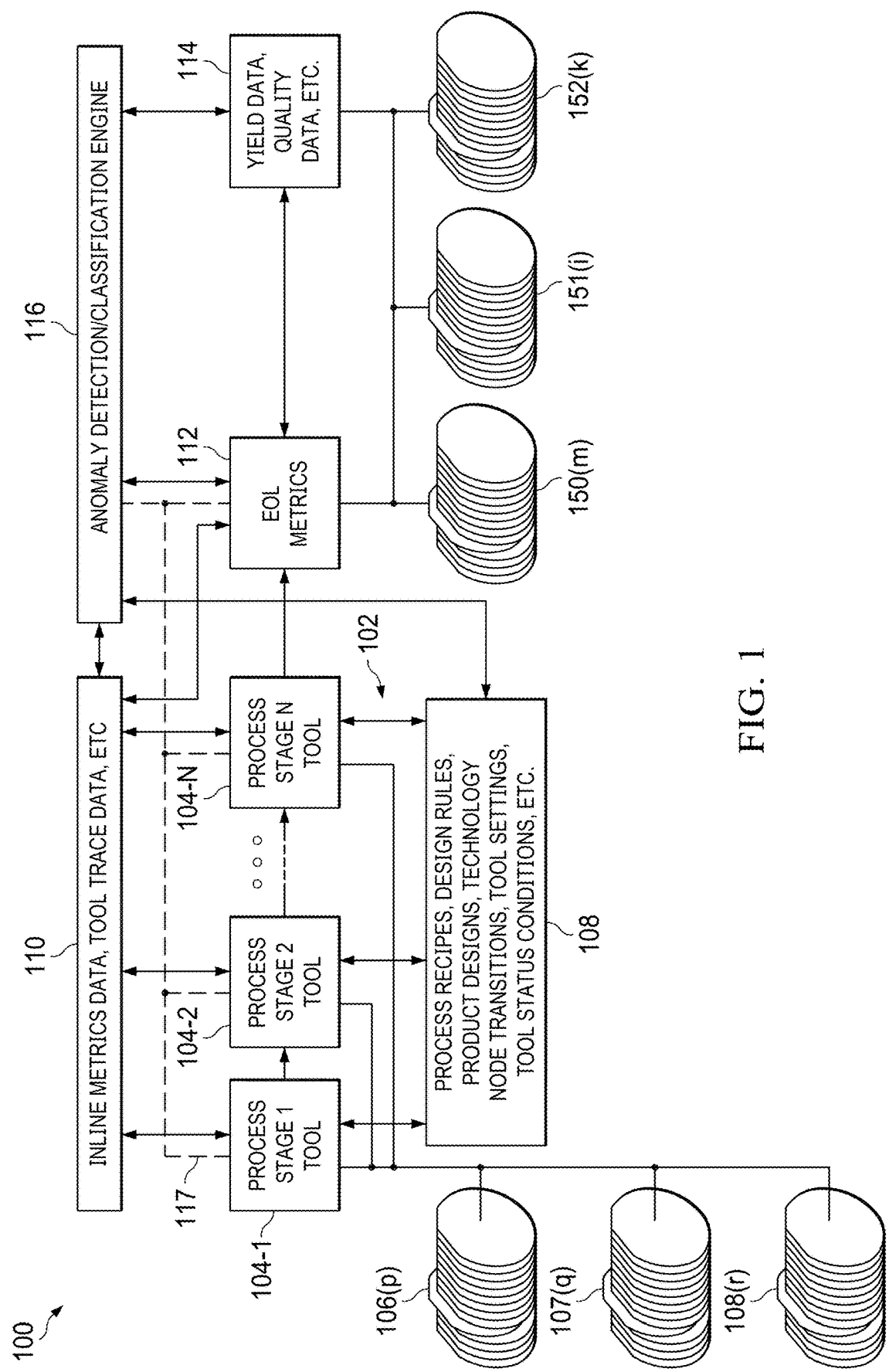
FIG. 1 depicts a representative semiconductor manufacturing system wherein a variety of time series signals may be monitored and analyzed for anomaly detection according to some examples of the present disclosure.

Examples of the disclosure are described with reference to the attached Figures wherein like reference numerals are generally utilized to refer to like elements. The Figures are not drawn to scale and they are provided merely to illustrate examples. Numerous specific details, relationships, and methods are set forth below to provide an understanding of one or more examples. However, it should be understood that some examples may be practiced without such specific details. In other instances, well-known subsystems, components, structures and techniques have not been shown in detail in order not to obscure the understanding of the examples. Accordingly, it will be appreciated by one skilled in the art that the examples of the present disclosure may be practiced without such specific components, structures or subsystems, etc.

Additionally, terms such as "coupled" and "connected," along with their derivatives, may be used in the following description, claims, or both. It should be understood that these terms are not necessarily intended as synonyms for each other. "Coupled" may be used to indicate that two or more elements, which may or may not be in direct physical or electrical contact with each other, co-operate or interact with each other. "Connected" may be used to indicate the establishment of communication, i.e., a communicative relationship, between two or more elements that are coupled with each other. "Directly connected" may be used to convey that two or more physical features touch, or share an interface between each other. Further, in one or more examples set forth herein, generally speaking, an element, component or module may be configured to perform a function if the element may be programmed for performing or otherwise structurally arranged to perform that function.

Whereas the teachings of the present disclosure may be practiced in any field where times series observations are made or obtained with respect to a monitored system or phenomenon for analysis, examples will be set forth below, without limitation, in the context of a semiconductor IC device manufacturing environment.

For purposes of the present disclosure, an IC device manufacturing environment may be a production facility or a foundry that may be configured to run one or more product lines, types, designs, etc., using a variety of process recipes organized into one or more fabrication flows in accordance with known or heretofore unknown semiconductor technologies, wherein a broad range of processing tools may be deployed at respective fabrication stages. Depending on implementation, example semiconductor technologies may comprise bipolar junction transistor technologies, metal oxide semiconductor (MOS) technologies, complementary metal oxide semiconductor (CMOS) technologies, double-diffused metal oxide semiconductor (DMOS) technologies, etc., including analog and/or digital device designs. In some examples, a combination of semiconductor technologies may be implemented, wherein different technologies suitable for respective types of product design may be integrated within the same chip or IC device, e.g., BiCMOS (a bipolar-CMOS combination technology where bipolar technology may be used for analog functions and CMOS may be used for digital logic design), BCD (a bipolar-CMOS-DMOS combination technology where DMOS may be integrated within the IC device for power and high-voltage portions that also has analog and digital portions), and the like. Relatedly, some example high mix environments may also be configured to fabricate various types of IC devices using multiple technology nodes, which may also be referred to as process nodes or simply "nodes", wherein a technology node may refer to a specific semiconductor manufacturing process and its design rules. Depending on the manufacturing facility, different nodes may correspond to different circuit generations and architectures. Generally, the smaller the technology node, the smaller the feature size, thereby resulting in smaller transistors that are typically faster and more power-efficient in some implementations. Further, an example technology node may refer to a transistor's feature sizes such as, e.g., gate lengths, a metal layer's half-pitch, etc. Accordingly, example technology nodes in some representative IC device manufacturing environments may comprise 22 nm nodes, 16 nm nodes, 14 nm nodes, 10 nm nodes, etc., and/or any combination thereof. Still further, a product mix of some example foundries may comprise IC devices that may be deployed in myriad applications such as, e.g., audio/video applications, telecommunications applications, automotive applications, digital signal processing applications, optical networking applications, digital control applications, Internet-of-Things (IoT) applications, and the like.

Depending on implementation, a semiconductor IC device manufacturing flow may comprise a number of processing stages involving wafer fabrication and backend operations such as e.g., front-end-of-line (FEOL) operations, middle-of-line (MOL) operations, and back-end-of-line (BEOL) operations, which may be followed by "post-fab" processing stages that may include wafer test, backgrinding, die separation, die test and IC packaging for shipping. Regardless of the process node or technology used and/or the product mix(es) involved, the FEOL/MOL/BEOL stages of a flow may comprise one or more thin-film and/or thick-film processing/deposition stages, one or more photolithography stages, implant stages, thermal treatment stages, etching stages, chemical-mechanical polishing (CMP) stages, metallization/interconnect stages, etc., among others, wherein a plurality of semiconductor wafers may be processed on a wafer-by wafer basis, on a lot-by-lot basis, or in a batch mode involving a number of wafer lots or process runs, using appropriate tooling and equipment. At an example process step, a material layer of the semiconductor wafer may be processed so as to alter one or more physical and/or electrical characteristics of the material layer. In some examples, a process step may add to or subtract from a material layer, e.g., deposition of conductive layers, non-conductive or dielectric layers, etching or polishing of layers, and the like. In general, the tooling equipment used in performing various process steps of any FEOL/MOL/BEOL stages of a manufacturing flow may be operated and monitored under suitable controls, which may be effectuated manually and/or automatically, in order that appropriate information regarding the process parameters, operational tool settings, operator interaction variables, etc. may be gathered and analyzed for effectuating suitable process control. Similarly, the equipment deployed at various post-fab stages may also be operated and monitored, whereby data may be gathered and analyzed for facilitating appropriate process control.

In an example manufacturing environment, a variety of inline measurement and testing equipment may be deployed at and/or in between various processing steps in order to ensure that appropriate tool parameters and settings, process variables, design rules, electrical parameters, etc., are within applicable control limits. For example, with respect to the tooling equipment deployed in a foundry, each tool and its components may be monitored periodically, thereby generating various time series data signals or observations relative to one or more tool parameters, which may be broadly referred to as tool trace data for purposes of the present disclosure. In some arrangements, tool trace data may comprise discrete time series signals, discretized or sampled continuous time domain signals, and/or any combination thereof. By way of illustration, a plasma etch tool may be monitored with respect to chamber pressure, plasma source power, wafer sample temperature, etc. In some example implementations, the plasma etch tool may be configured to control the pressure in the chamber using a throttle valve on an exhaust port, thereby allowing the tool to operate with a range of acceptable pressure settings regardless of the gases selected. Accordingly, various times series data relative to plasma RF power, throttle valve position, etc., may be monitored in some examples. Regarding inline process metrics, some example environments may deploy thin film metrology based on ellipsometry or reflectometry to monitor the thickness of gate oxide, as well as the thickness, refractive index and extinction coefficient of photoresist and other coatings that may be applied to the semiconductor wafers at various stages. In some examples, inline wafer defect detection systems may be deployed to monitor both micro- and macro-defects, e.g., including particle counts, solvent drips, material residues after clean, striations, scratches, resist bubbles, etc. In addition to inline measurement and testing, the semiconductor wafers may be tested after BEOL processing, e.g., before die preparation and singulation, for compliance with various electrical parameters, quality/reliability requirements, as well as for characterizing wafer yield data and/or functional binning data, where yield may be defined as the percentage of functional die per wafer (DPW). For purposes of some examples herein, data relating to the inline measurement variables and/or EOL variables illustrated above may be referred to as response metrics data that may also be monitored as time series data, which may be analyzed in combination with or independent from the various types of tool trace data from different process stages for detecting anomalous signals in accordance with the teachings herein as will be set forth in detail further below.

In some example arrangements, one or more statistical process control (SPC) or statistical quality control (SQC) methodologies may be deployed in a manufacturing facility in order to monitor and control the deployed fabrication flows and associated tooling equipment both at inline stages as well as at EOL stages. In some implementations, example SPC/SQC methodologies may be configured as univariate analysis (UVA) models deployed at a targeted process step of a flow so as to help ensure that the targeted process step and/or associated tooling equipment is operating efficiently and within control, thereby producing more conforming products with less waste in the downstream flow (e.g., rework, scrap or other disposition). For example, process wafers, wafer lots, groups of wafer lots, etc., collectively referred to as sampling units, may be monitored to ascertain that applicable control limits and/or specification thresholds are satisfied with respect to one or more measurement parameters and/or variables relevant to the sampling units processed at the targeted stage. In some arrangements, example UVA methodologies may include generating run charts, control charts, etc., as well as performing process capability analyses and/or conducting statistically designed experiments, and the like, wherein various types of time series data such as, without limitation, inline measurement data, EOL yield and quality data as well as equipment settings data (e.g., tool trace data) may be produced, processed, stored, and deployed for purposes of yield management, quality control/assurance, etc.

It should be appreciated that increasing product lines/mixes and technology nodes at a foundry may often be accompanied by an increase in the variety of process recipes and flows running on a large set of tools deployed at the foundry, which can give rise to a significant increase in the number and types of time series data. Monitoring and analyzing such data for potential fault detection using baseline UVA methodologies can be expensive as well as time-consuming. For example, a trace data signal may be sub-sectioned into multiple monitoring windows where summary statistics may be determined with respect to each window, which may be accompanied by appropriate control limits determined by one or more subject matter experts. When a control limit is breached, a suitable alarm signal may be generated. Because of the time-consuming nature of the foregoing process, however, the number of signals monitored may be limited to a small number of important processing stages (e.g., etch, deposition, implant, etc.) and/or tool parameters and variables that are considered to be critical with respect to a targeted processing stage. Due to the lack of a more comprehensive view of the time series signals in a baseline implementation, important transitional conditions and signal excursions may often go unnoticed in a complex manufacturing environment such as a high mix semiconductor foundry. Whereas some transitions and signal excursions can be benign, others may negatively impact downstream processing, potentially leading to yield, quality and reliability issues at the EOL stage, especially in view of the sequential nature of wafer processing as illustrated above. It should also be appreciated that troubleshooting out-of-specification and/or out-of-control tool trace data, inline measurement data as well as reduced yields or compromised quality/reliability within the context of—and relative to—various tooling transitional states of a high mix manufacturing environment can be particularly challenging as the transitions often go unnoticed and/or unresolved in a timely fashion. Further, as pluralities of wafers or wafer lots are processed in groups or batches back-to-back at different stages, delays in identifying and resolving transitional issues or anomalous signal excursions can have a ripple effect in the downstream flow, thereby undermining a foundry's process control and yield management goals.

Examples described herein recognize the foregoing challenges and contingencies and accordingly provide an anomaly detection and classification scheme based on a trained neural network engine coupled with an outlier detection mechanism configured to identify potential anomalous time series signals in an efficient manner adapted to complex systems involving a large number of signal generators. In the context of a semiconductor manufacturing environment, the signal generators may be comprised of or associated with a plurality of processing stages, corresponding tooling equipment and tool settings/parameters, instrumentation with respect to FEOL/BEOL/EOL response metrics, etc. Some examples may be configured to facilitate automated and/or autonomous triggering of an out-of-control action (OCAP) module operable to effectuate one or more suitable disposition actions with respect to a time series signal identified or otherwise classified as an anomalous signal. In some implementations, an OCAP module may be configured to generate suitable inline and/or EOL alarm signals in response to identifying one or more actionable anomalous signals at different stages in a process flow wherein appropriate corrective action(s) may be undertaken, which may include, without limitation, adjusting tool settings, adjusting processing parameters of one or more process steps, re-seasoning, servicing or reconditioning of the tooling equipment, etc. In some arrangements, an example implementation may be configured to identify actionable anomalous signals relative to semiconductor process wafers that may be sampled at wafer level, lot level or frame level (e.g., a process run comprising a group of wafer lots), etc. It should be appreciated that whereas the examples of the present disclosure may be expected to provide some tangible improvements over baseline UVA-based fault detection monitoring and yield management tools, no particular result is a requirement unless explicitly recited in a particular claim appended hereto.

Turning to Figures, FIG. 1 depicts a representative manufacturing system 100 configured to fabricate semiconductor devices or wafers in one or more process flows wherein various time series signals relating to tool trace data, process variable data, yield data, etc., may be monitored and analyzed for anomaly detection according to some examples of the present disclosure. As illustrated, the manufacturing system 100A may comprise a plurality of process stages or steps 104-1 to 104-N that may be run on corresponding tooling stations associated therewith, respectively, which may be co-located, distributed or otherwise disposed in one or more foundry facilities, collectively referred to a fabrication plant 102. In some arrangements, the process stages 104-1 to 104-N, which may comprise FEOL, MOL, and/or BEOL portions of various process flows, respectively, may be configured or reconfigured depending on the technology nodes and product mix combinations supported by the manufacturing system 100. Example processing stages or techniques may comprise without limitation, wafer cleaning, surface passivation, photolithography, ion implantation, dry etching (including, e.g., plasma etching, reactive-ion etching, atomic layer etching, etc.), wet etching, deposition (including, e.g., chemical vapor deposition, physical vapor deposition, atomic layer deposition, molecular beam epitaxy, etc.), plasma ashing, thermal treatments including rapid thermal annealing, metallization, chemical-mechanical polishing, die singulation, wire-bonding, etc. It should be apparent that the foregoing list does not necessarily imply a specific order, nor that all listed processing stages or techniques are executed during manufacture of a particular IC device or product. In general, different process flows run in the manufacturing system 100 may each have a respective order of the processing stages, wherein semiconductor wafers (also referred to as substrates, process wafers, semiconductor process wafers, or simply wafers) for forming or containing IC devices at different stages of formation may be processed using applicable process recipes on a wafer-by-wafer basis, lot-by-lot basis, or as batch of wafer lots, by respective tooling stations as noted previously. By way of illustration, wafer lot groups 106(p), 107(q), 108(r) are each examples of pluralities of wafers or wafer lots, wherein the wafers may be of different sizes, that may be processed using at least a portion of the illustrated process stages 104-1 to 104-N for fabricating different types of IC devices or products.

Depending on the combination(s) of technology nodes and product mixes supported by the fabrication plant 102, example process stages 104-1 to 104-N may be effectuated based on corresponding process recipes, tool settings, operational parameters, etc., which may be changed dynamically as needed in order to accommodate the processing of wafers with different types of IC devices. Further, at least some tools deployed at respective process stages may undergo various states, e.g., idling, offline (e.g., down), online (e.g., up and running), test/pilot mode, production mode, trial mode, development mode, post/pre-conditioning, etc. For purposes of the present disclosure, reference number 108 collectively refers to at least a portion of various manufacturing conditionalities relating to process recipes, tool settings and states, etc. that may be monitored for obtaining various types of time series signals relative to respective process stages 104-1 to 104-N.

Additionally, in some arrangements, one or more product characterization stations 110 may be deployed with respect to monitoring various parameters and variables, e.g., associated with the semiconductor wafers as they are processed through different process stages 104-1 to 104-N. Depending on implementation, example inline metrics may comprise data relating to critical dimensions (CDs), gate lengths and overlays, film thicknesses and uniformities, macro- and micro-defect counts, etc., as well as electrical properties such as sheet resistance and the like. In some arrangements, an example product characterization stations 110 may also be configured to monitor, receive and/or otherwise obtain various trace data signals with respect to the processing stages from the 104-1 to 104-N and associated tooling equipment. Further, one or more EOL metrics stations 112 may also be provided, which may be configured to monitor, receive or otherwise obtain time-dependent EOL metrics data 114 relating to yield, functional/electrical parametrics, quality and reliability performance, etc., with respect to pluralities of wafer lots, e.g., wafer lot groups 150(m), 151(i), 152(k), processed through the BEOL stages of respective process flows. In some arrangements, example EOL metrics stations 112 may be configured as or associated with wafer probe stations operable to test wafers for functional defects by applying specific test patterns depending on the functionalities of the IC devices formed in the wafers.

As will be set forth in detail further below, an anomaly detection and classification (ADC) engine 116 may be configured to analyze various time series signals, referring to herein as observations, obtained from any portion of the manufacturing system 100, based on a class of trained neural networks known as convolutional autoencoders (CAEs) coupled to a suitable outlier determination mechanism that is fitted to a latent feature space of a particular trained CAE module. In some arrangements, the ADC engine 116 may be configured to generate appropriate response triggers or signals 117 provided to one or more process stages 104-1 to 104-N and/or associated tooling equipment in order to effectuate suitable adjustments with respect to one or more process parameters of the process stage, tool settings, and the like. In some arrangements, the ADC engine 116 may be implemented as a real-time, enhanced inline SPC/SQC station, e.g., in conjunction with a product characterization station 110, for facilitating dynamic interdiction of a process flow in response to detecting anomalous time series signals at a targeted process stage in the manufacturing system 100. Further, an implementation of the ADC engine 116 may be deployed in association with an EOL yield management or enhancement tool configured to facilitate the detection and correlation of yield loss or reduction with respect to process variation, tool settings, process corners, particulate defects, etc.

Figure 2:
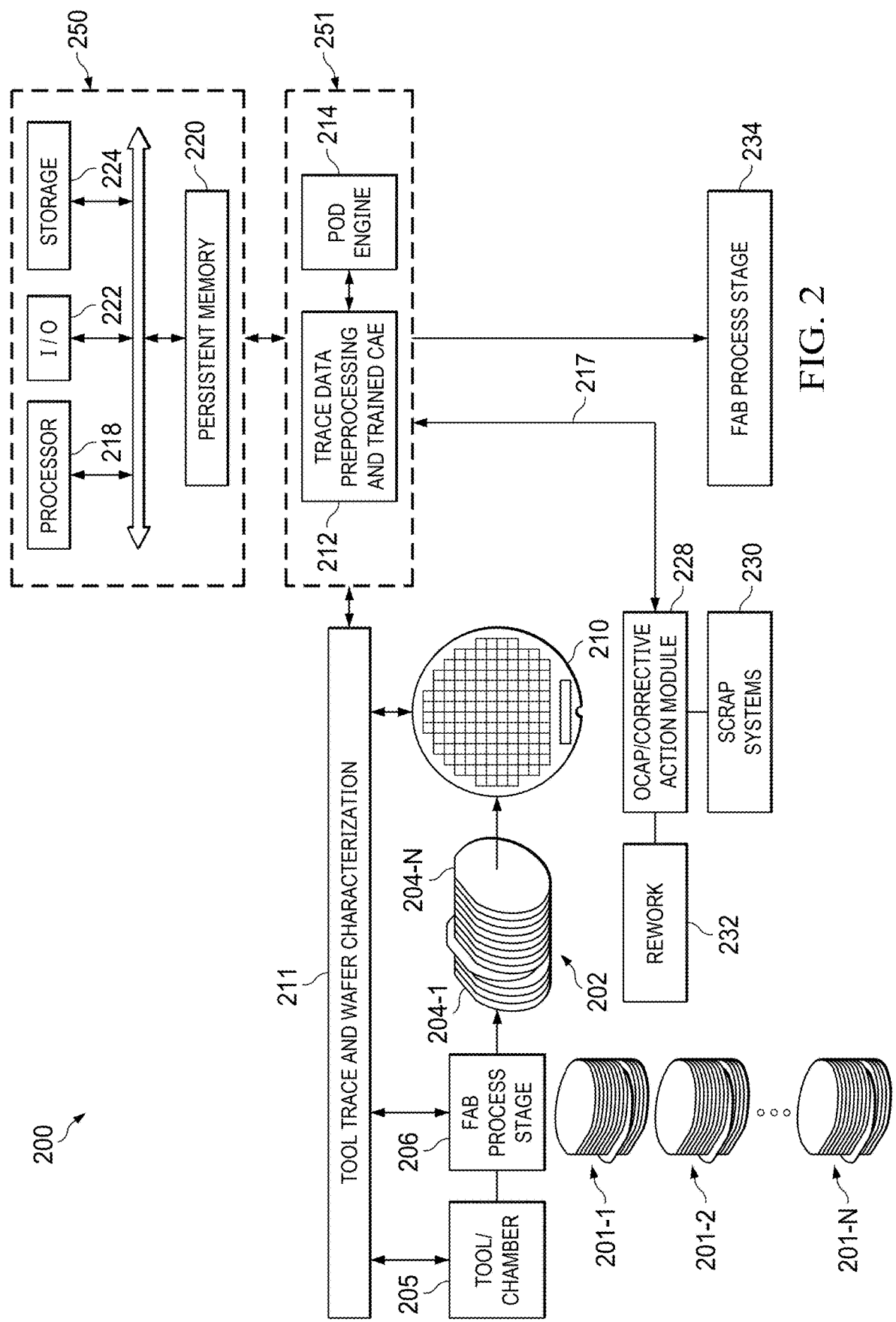
FIG. 2 depicts a portion of a manufacturing system comprising a targeted process step for processing semiconductor wafers using a fabrication tool wherein tool trace data may be characterized for anomaly detection using an ADC engine in accordance with some examples.

FIG. 2 depicts a portion 200 of a semiconductor manufacturing system wherein an ADC engine may be implemented for identifying and classifying anomalous time series signals in accordance with some examples. Depending on implementation, system portion 200 may comprise a targeted process step 206 and associated tooling/manufacturing stage 205 configured to process one or more wafer lots 201-1 to 201-N, e.g., including a wafer containing an integrated circuit at an intermediate stage of formation, wherein the tool may be loaded with the wafers, lot-by-lot, or chamber-by-chamber where multiple lots are loaded as a frame run, and in a given slot order sequence that identifies a run sequence of loading of the wafers from a lot into the tool 205. In some arrangements, tool 205 may be associated or integrated with at least one sensor selected from one or more position sensors, pressure sensors, thermal sensors, optical sensors, chemical sensors, motion sensors, level sensors, proximity sensors, and humidity sensors, without limitation, operable to generate a variety of tool trace data. In some arrangements, tool 205 or the associated manufacturing stage may include a process chamber configured to add to or subtract from a material layer of the integrated circuit of a wafer. As noted above, the wafer lots 201-1 to 201-N may comprise wafers of same or different technology nodes. In some arrangements, tool trace data and response metrics data may be collected by a characterization station 211, e.g., on a wafer-by-wafer basis, lot-by-lot basis and/or frame-by-frame basis, depending on relevant sampling or subsampling schemes implemented with respect to the targeted process step. As illustrated, a current wafer lot 202 comprising wafers 204-1 to 204-N may be measured or otherwise characterized by the characterization station 211 for obtaining response metrics data for each wafer or selected wafer 210 of the wafer lot 202. Further, the characterization station 211 may be configured to monitor relevant tool trace data as time series signals, wherein a time series signal or observation may comprise a series of datapoints or measurements indexed in time order over a configurable time period, e.g., over the duration of processing of a wafer, a wafer lot, or a batch of wafer lots depending on tool loading. An ADC engine 251 including a trained CAE module 212 and a trained pointwise outlier detector (POD) module 214 may be provided as a local entity or at a remote network node for analyzing and classifying the time series signals monitored with respect to the targeted process step 206. In some arrangements, an optional preprocessing module may also be provided as part of the ADC engine 251 in order to condition the time series signals as will be set forth further below. In one implementation, the characterization station 211 and/or the ADC engine 251 may be integrated with tool 205 associated with the targeted process step 206.

Regardless of whether the ADC engine 251 is deployed locally or at a remote network node, the ADC engine 251 may be implemented in any known or heretofore unknown hardware/software/firmware architectures on a suitable computing platform 250, e.g., a workstation or a server, having one or more processors 218 coupled to a persistent memory 220 containing machine-executable code or program instructions, which may be configured to effectuate the various modules and subsystems of the ADC engine 251 for anomaly detection. Appropriate input/output (I/O) modules 222 and one or more storage units 224 may be provided as part of the computing platform 250 depending on implementation. In some arrangements, depending on detecting an anomalous time series signal, appropriate corrective actions may be executed by a corrective action module, e.g., OCAP module 228, responsive to suitable control signals 217 generated by the ADC engine 251. Some corrective action plans may comprise disposition actions relating to the tool and the targeted process step 206, e.g., adjusting relevant tool settings, servicing the tool or its components, and/or modifying applicable process recipes, variables and parameters of the targeted process step 206. In some arrangements, corrective actions may also comprise wafer disposition actions, e.g., identifying the wafer(s) for scrapping or reworking as respectively indicated by blocks 230 and 232, depending on fabrication flow management strategy including cost-benefit considerations as to wafer scrap and reworking guidelines as well as the institutional knowledge and domain expertise relating to the targeted process stage. Where the process stage 206 comprises an intermediary stage in the process flow, wafer lots 201-1 to 201-M may proceed to a next stage or step 234 after being appropriately characterized, e.g., in the event that no anomalous time series signals are observed during the processing of the wafer lots 201-1 to 201-M and the response metric data of the wafers of the current process run is within applicable controls and specifications (after reworking where needed).

Figure 3A:
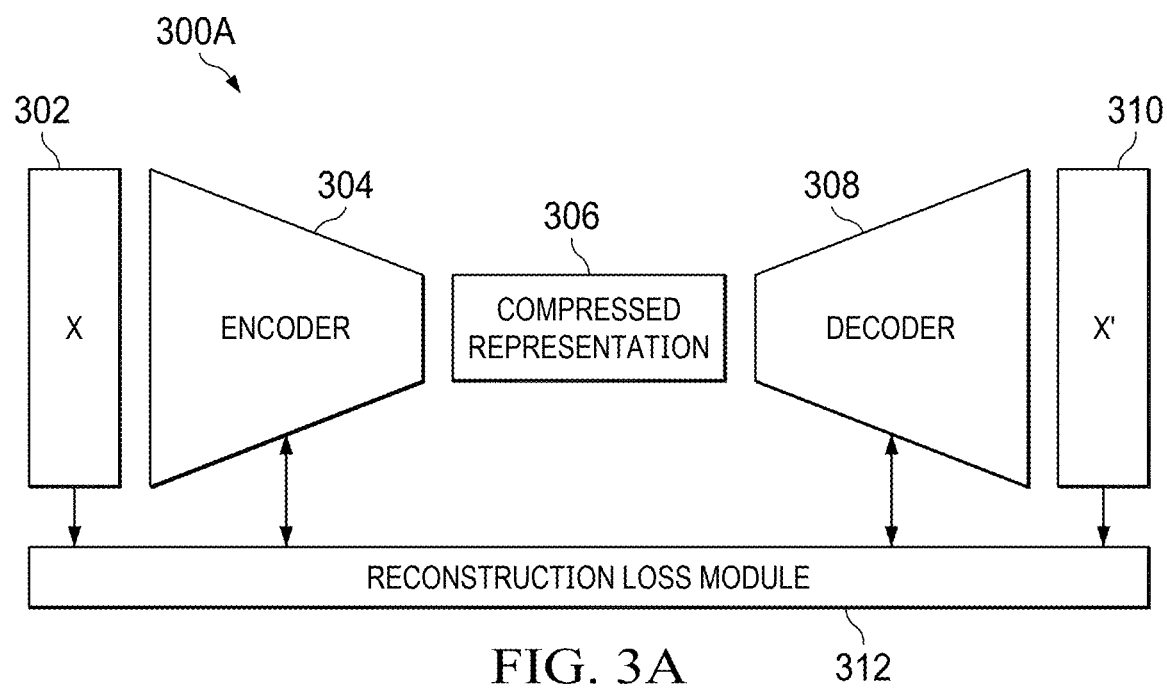
FIG. 3A depicts a generalized neural network (NN) engine operable as a convolutional autoencoder (CAE) that may be deployed as part of an ADC engine for anomaly detection in a semiconductor fabrication flow in some examples.

In one arrangement, the CAE module 212 may be configured as a neural network (NN) engine trained to learn (i) efficient coding and compression of unlabeled input data into a reduced encoded representation, and (ii) how to reconstruct the data back from the reduced encoded representation to a representation that is as close to the original input data as possible, in a process referred to as unsupervised learning or self-supervised learning. In general, the NN engine may comprise an encoder module, a decoder module, a latent feature space or layer having a reduced dimension that contains the compressed/encoded representation of the input data, and a reconstruction loss function. Taking reference to FIG. 3A, depicted therein is a generalized NN engine 300A that may be configured to operate as a CAE module according to some examples. Input data 302 may be any time series data, e.g., equipment data, sensor data, etc., which may be provided to an encoder 304 configured to transform the input data through a series of convolution operations into a compressed representation contained in a latent feature space 306 (also referred to a latent space, a hidden layer, or a "bottleneck" layer). The compressed representation, or the code signature, may be provided to a decoder module 308 configured to perform a corresponding series of transposed convolution operations to reconstruct a representation 310 of the original input data 302. A reconstruction loss function 312 is operable to measure the accuracy of the decoder 308 in reconstructing the original input data 302, generally in terms of an error function based on the difference between input data 302 and corresponding representation 310, which may be used in training the NN engine 300A, e.g., in a backpropagation mechanism. In some arrangements, a training phase may involve executing several iterations or epochs and using suitable training data, wherein the NN engine 300A may be configured to learn an efficient compressed representation of input data in a latent feature space, e.g., the most compact compression required to reconstruct the original data with an acceptable error level. In other words, the latent feature space is operable to encode the input data into a meaningful abstract representation while ignoring "noise" or insignificant information in the data, wherein the compressed representation functions as a "mnemonic rule" used by the NN engine 300A to reproduce the input data as faithfully as possible. The NN engine 300A may therefore be realized as a combination of two mapping modules realized as encoder 304 that maps an input domain to a compressed domain and decoder 308 that maps the compressed domain back to the input domain, wherein the mapping functionalities may be achieved by respective convolution and transposed convolution operations that may comprise nonlinear transformations of data.

In some arrangements, the number of convolution operations and corresponding transposed convolution operations to be performed by the encoder 304 and the decoder 308, respectively, may depend on the complexity of the input data 302. Generally, the more complex the input data is, the more convolution and transposed convolution operations are needed. Further, as the convolution operations are performed to reduce the dimensionality of input data, higher dimensional inputs may require more convolution operations. Accordingly, the encoder 304 and the decoder 308 may each comprise a plurality of convolution and transposed convolution layers, respectively, (not specifically shown in this Figure), wherein each convolution layer and corresponding transposed convolution layer may have respective connection weights, filters and biases, that may be learned during the training phase of the NN engine 300A.

Figure 3B:
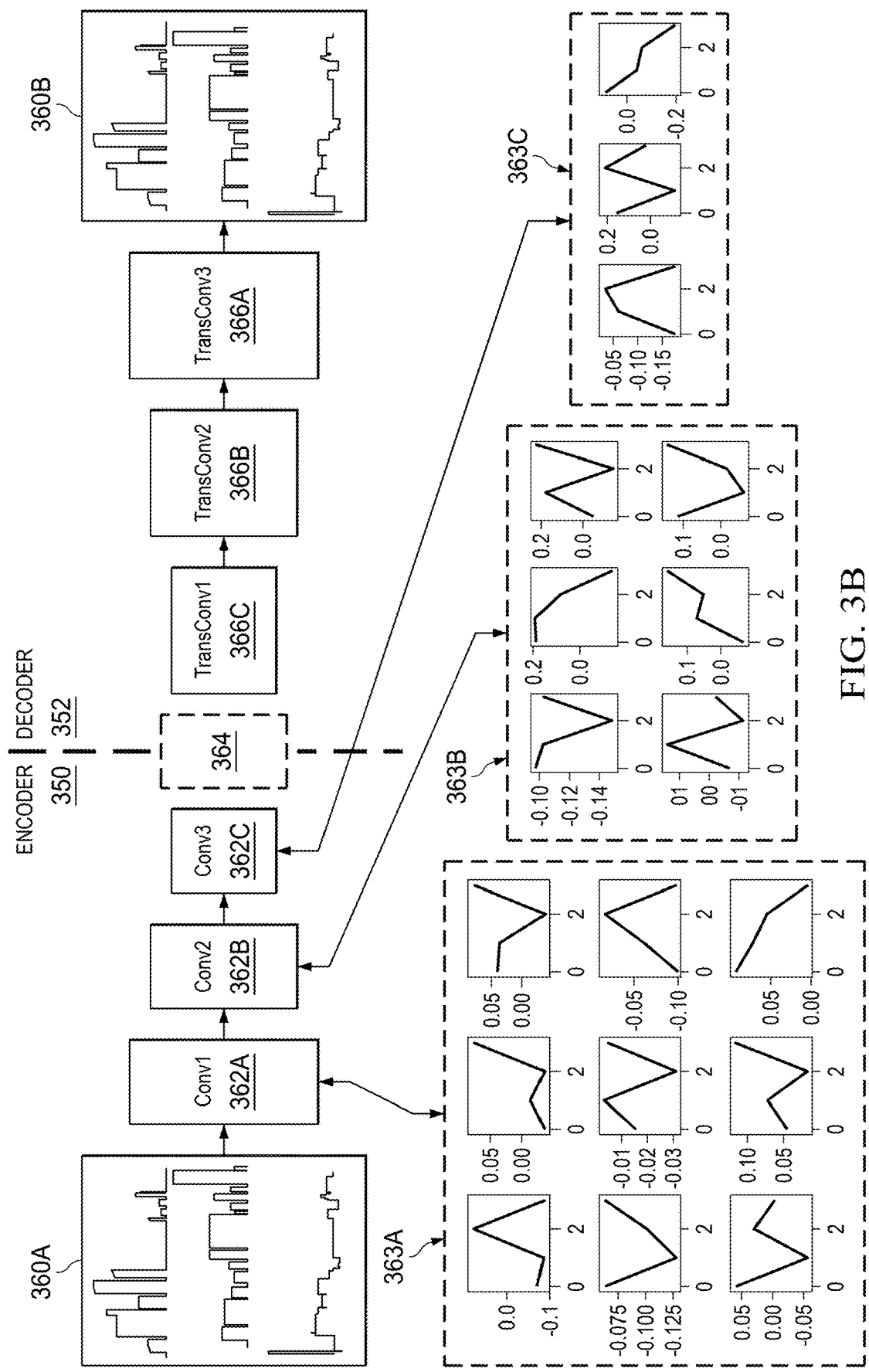
FIG. 3B depicts additional details of an example CAE module according to some implementations.

FIG. 3B depicts an example CAE engine 300B that may be configured in accordance with the framework of the NN engine 300A set forth above in some implementations. An encoder 350 and a decoder 352 are illustrated as having three convolution layers 362A-362C and three corresponding transposed convolution layers 366A-366B, respectively. Encoder 350 is operable to compress and encode a variety of time series signals 360A into respective compressed representations (e.g., codes) in a latent feature space 364. In the example architecture illustrated in FIG. 3B, the convolution layer 362A may be configured as a set of 32 filters, wherein nine of them are shown as an array 363A without limitation, having respective biases/weights that are derived by the CAE engine 300B during training. Likewise, the convolution layer 362B may be configured as a set of 16 filters, wherein six are shown as an array 363B without limitation, with respective weights/biases and the convolution layer 362C may be configured as a set 363C of three filers with respective weights/biases. It should be appreciated that the encoder example shown in FIG. 3B is a simplified illustration of a specific implementation wherein additional aspects, e.g., pooling layers, are not displayed. Regardless of how an example encoder is implemented, each input time series signal may be compressed into a code signature that comprises a plurality of datapoints in the latent feature space 364, referred to herein as compressed datapoints for purposes of the present patent application, by the operation of encoder 350, wherein the code signature is decomposed into three channels effectuated by the three filters of the final convolution layer 362C. The latent feature space 364 may therefore be viewed as an assemblage of abstract 3-dimensional (3D) spaces, wherein the three dimensions of each 3D space correspond to the three channels, respectively, and each compressed datapoint may be represented as a triplet or 3-tuple in a corresponding 3D space. Skilled artisans will recognize upon reference hereto that where a final convolution layer has more than three filters or features, thus generating more than three channels, the resulting LFS may comprise an assemblage of n-dimensional hyperspaces, the total number of the hyperspaces in the assemblage being equal to the number of compressed datapoints of a coded representation corresponding to an input signal. It should further be appreciated that the number (p) of compressed datapoints of a coded representation in the LFS is less than the number (q) of time-indexed datapoints in the input signal because of reduced dimensionality.

Decoder 352 is operable to reconstruct the input signals 360A by operating on the corresponding codes in the LFS 364 via successive transposed convolution layers 366A-366C in a reverse direction with respect to the convolution operations of encoder 350. Analogous to the simplified illustration of encoder 350, decoder 352 is shown shorn of additional details, e.g., up-sampling layers, without loss of generality. Whereas reconstructed signals 360B are expected to be close approximations of the input signals 360A (e.g., within certain bounds), there may be reconstruction error signals that may be monitored for detecting anomalous behavior with respect to the input signals in some arrangements. Some baseline implementations may therefore be configured to identify anomalous input signals based on monitoring reconstruction error signals and applying suitable thresholds with respect to the reconstruction error signals for purposes of classification. In such arrangements, a full CAE engine including both the encoder portion and the decoder portion may be used for anomaly detection by training the underlying neural network to reconstruct normal or typical patterns in the training data, and then using the reconstruction error to identify anomalous or unexpected patterns in a test input signal. If the test input signal is similar to the training data, the reconstruction error will be low. Conversely, the reconstruction error will be high where the test input signal is significantly different from the training data, thereby indicating that the input signal is likely to be anomalous. However, there are known drawbacks to using the reconstruction error signals obtained in a full CAE engine as a measure for anomaly detection such as, e.g., lack of inter-operability, sensitivity to noise, and incorrect threshold selection, to name a few.

Examples of the present disclosure may therefore involve configuring a CAE engine and utilizing the trained encoder portion and associated latent feature space (e.g., a partial CAE engine) in conjunction with a robust outlier detection mechanism that is trained and fitted to the latent feature space in order to identify and classify anomalous patterns in a more precise manner. In some arrangements, whereas the decoder portion of the CAE engine may be used in mapping back to the original input signals, it is not involved in determining anomalies in the input signals, as will be set forth in further detail below.

An example CAE-based architecture may be configured to include one or more of the following modules in various arrangements. A training module may be configured to build the underlying machine learning (ML) model (e.g., the NN engine 300A/300B described above) based on training data comprising mostly normal observations with a small number of anomalous observations, wherein an outlier detection module is fitted to the LFS of the CAE engine. An anomaly detection/classification module may be configured to receive new, previously unseen time series input data signals, referred to candidate time series signals, and process through the trained encoder and outlier detector modules to obtain a prediction and/or classification of the candidate time series signals as anomalous or non-anomalous (e.g., normal). An input data quality module may be configured to evaluate whether the input time series signals, e.g., used in training or provided as candidate time series signals for testing, satisfy a minimum level of data quality (e.g., the percentage of the number of datapoints in a particular time series signal or observation relative to the expected number of datapoints for that observation), etc. In some arrangements, the input data quality module may also be configured to verify whether an input time series signal has a sufficient length, e.g., containing a minimum number of datapoints or measurements indexed over a suitable time period, and provide appropriate data padding if necessary. In some arrangements, the input data quality module may be configured to check if there are large segments or regions of missing data measurements in an input time series signal. In some arrangements, the input data quality module may be configured to determine whether the input time series signal should be discarded due to insufficient data measurements. In general, an example input data quality module may be configured to determine, identify or otherwise characterize whether an input time series signal is a signal that is qualified to be used in training and/or suitable for anomaly detection if provided as a candidate time series signal for testing.

To configure a CAE-based engine for anomaly detection, the network is first trained on a set of normal or typical data samples, which is often application-specific and may be determined by domain experts based on historical patterns, etc. In the context of CAE training, "normal" time series data for purposes some examples herein may refer to time series data that is representative of the typical behavior or patterns of a monitored system being modeled. Accordingly, determining what constitutes a "normal" time series is often based on the specific application and domain knowledge of the system. For example, in the case of monitoring equipment/tool trace data, a "normal" time series signal may comprise data collected from the equipment in a known healthy state, wherein the criteria used to determine "normal" time series data may be based on prior knowledge and history of the equipment's performance, such as tool specifications, SPC run charts etc. In some arrangements, time series data close to maintenance events, from runs that result in tool alarms, or from test/pilot runts, etc., may be excluded from forming a training dataset. In some arrangements, the state of health of a tool and/or the quality of the time series data may be verified against suitable inline metrics corresponding to a sample of process runs through the tool. In some arrangements, the number of normal time series signals used in training may vary depending on the complexity and/or criticality of the tool trace data as well as the amount of available data. In general, whereas more data is better for training, there is often a tradeoff between the amount of data used and the computational resources required for training.

Figure 4A:
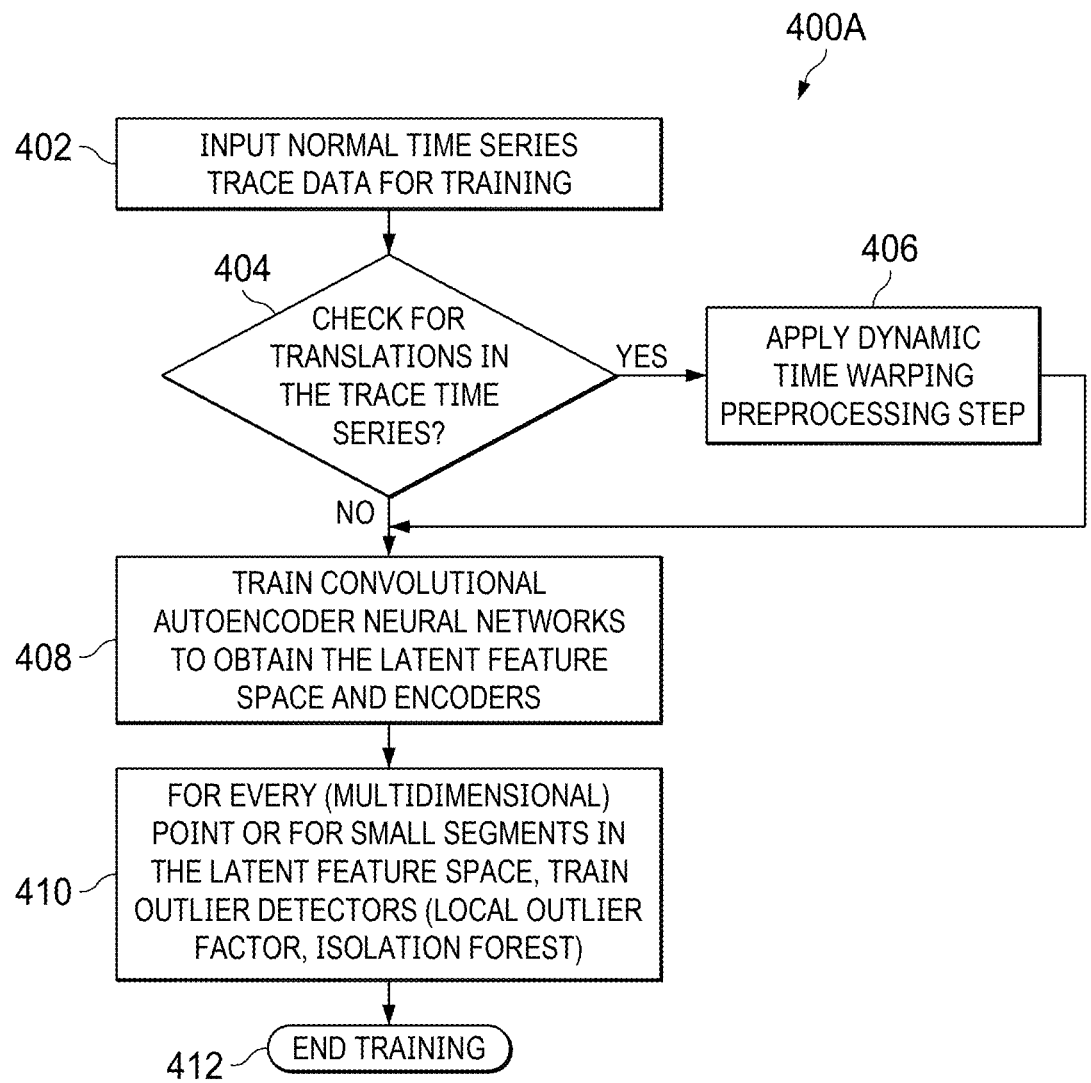
FIGS. 4A and 4B depict representative training and classification schemes, respectively, associated with configuring and deployment of an ADC engine in an example implementation.
Figure 4B:
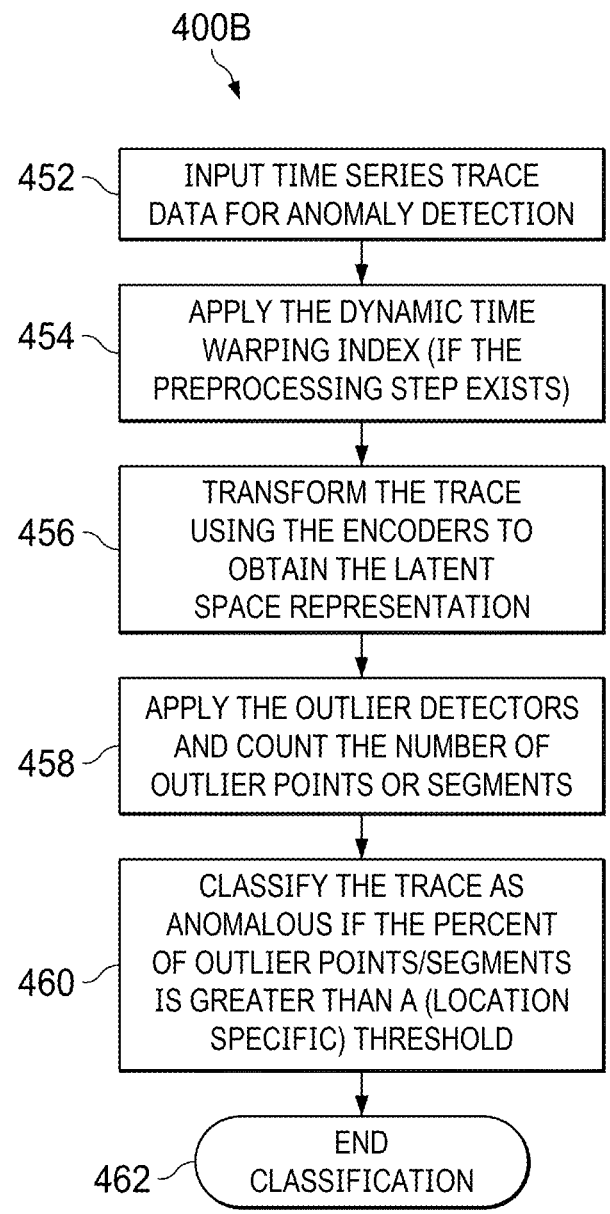

FIGS. 4A and 4B depict representative training and classification processes associated with configuring and deployment of an ADC engine according to some examples. Reference number 400A of FIG. 4A generally refers to a training process or module where an optional data preprocessing module may be provided as part of implementation. Block 402 is illustrative of conditioning input data for data quality as described above, wherein various quality operations may be effectuated in order to ensure that suitable normal time series signals are provided as a training dataset. In some arrangements, the time series signals, which may represent various physical quantities or variables having appropriate units, may be normalized prior to training and/or prediction/classification, e.g., normalized to values having respective arbitrary units or no units. Block 404 is a determination module operable to determine if additional data preprocessing is needed for the time series signals where the data may have translations from one time series signal to another, e.g., a translation in the time axis of the respective time series signals. It should be appreciated that translations in the input time series data may degrade the performance of anomaly detection and may cause false and/or missed alarms. Accordingly, where the datasets comprise time series signals with translations, an optional preprocessing module 406 may be provided for aligning the time series signals such that matched indices may be obtained for the time series signals. In an example implementation, such preprocessing may involve applying the Dynamic Time Warping (DTW) technique to obtain the matching indices for the input time series signals, although other preprocessing techniques may be applied in additional or alternative arrangements. Additional details regarding optional preprocessing of the time series signals for removing translations therein may be found in the U.S. Provisional Patent Application No. 63/493,610, referenced and incorporated hereinabove, to which the present patent application claims priority.

Block 408 refers to ML-based training using the input training dataset (with or without optional DTW preprocessing) to obtain a trained CAE engine including an encoder, a decoder and a latent feature space. As previously noted, an example CAE engine may be trained based on mostly normal data with a small number of anomalous observations in order to learn efficient data representation (encoding/compression) of the normal data while ignoring some of the "noise" inherent in the data through dimensionality reduction. After the CAE engine is trained, the encoder portion may be utilized to effectuate the nonlinear mapping of any candidate time series signals to corresponding codes in the associated latent feature space. In some arrangements, the encoder may comprise a set of multi-kernel convolutional modules/layers followed by pooling modules/layers that compress the time series input into the latent feature space, wherein the number of convolutional modules and associated pooling modules may depend on the complexity and dimensionality of the input data as previously noted. In some arrangements, activation layers associated with the convolution layers may be configured to apply an element-wise activation function such as a rectified linear unit or ReLu (e.g., max{0,x}). Further, the pooling layers associated with the convolution layers may be configured to perform a down-sampling operation along the applicable channels or dimensions.

In some arrangements, the size of the latent feature space is operable to determine how much data must be compressed. In some arrangements, the size of the latent feature space may be operable as a regularization term to minimize overfitting in a training phase. It should be appreciated that regularization may be necessary in some arrangements in order to prevent the CAE engine from learning the identity function and to improve the generalization of the model, thereby increasing the ability of the CAE engine to capture important features and learn richer representations in an example implementation. For example, if the original data has complex features, the training process may be configured to yield a latent feature space that is large enough that the CAE engine is able to reconstruct the training data with a small reconstruction loss that is mostly due to the inherent noise in the data. In some arrangements, the number of convolutional layers may be configured as a hyperparameter to tune the autoencoders and to determine the depth of the constituent encoder and decoder neural networks. Skilled artisans will recognize that whereas a higher depth increases model complexity, a lower depth is faster to process in an example ADC implementation.

As part of the training process, the decoder portion of the CAE engine is operable to reconstruct the original output from the latent feature space based on reversing the mapping operations of the encoder portion through transposed convolution layers and up-sampling layers. After the CAE engine is trained, the encoder portion that nonlinearly transforms the input data to the latent feature space is preserved and may be deployed to map the candidate time series signals to respective latent feature space representations as corresponding code signatures through learned nonlinear transformations. As previously described, the latent feature space refers to a mathematical representation of data in which the underlying, hidden features or attributes of the data that are significant in some relevant aspects are identified and mapped onto a lower-dimensional space. Whereas the hidden features are not explicitly observable in the original data, they can be derived as abstract constructs defining a hyperspace by applying the encoder to the original data input.

Block 410 refers to a process of fitting one or more POD techniques at each compressed datapoint of a coded representation in the multidimensional latent feature space wherein there may be a population of n-tuples corresponding to the number of the input time series data signals, i.e., observations. In some examples, a Local Outlier Factor (LOF) technique may be fitted, at each compressed datapoint, with respect to detecting outliers in the population of n-tuples. Similarly, an Isolation Forest (IF) technique may be fitted at each compressed datapoint of the latent feature space in some arrangements for detecting outliers among the n-tuple population.

In some implementations, the LOF technique may be deployed as a distance- and density-based method or module for detecting outliers in a dataset. For example, LOF may be configured to measure the degree of deviation of an n-tuple datapoint with respect to its local neighborhood, e.g., by comparing its density to the densities of its neighbors. In an example, LOF may be configured to define a local reachability density (LRD) of an n-tuple datapoint as the inverse of the average reachability distance of its k nearest neighbors, where reachability distance is a measure of the distance between two datapoints considering the density of the datapoints in their local neighborhoods. Accordingly, the LRD may be provided as a value operable to measure the degree of isolation or local density of a datapoint. In some arrangements, the LOF score of a datapoint may be defined as the ratio of the average LRD of its k nearest neighbors to its own LRD. A high LOF value may indicate that the datapoint is significantly less dense than its neighbors, which suggests that it is a potential outlier. Conversely, a low LOF value indicates that the datapoint is similar in density to its neighbors and is likely not an outlier. In general, LOF(k)=1 is indicative of similar density as a datapoint's neighbors; LOF(k)<1 is indicative of higher density than the neighbors, thus indicating a potential inlier; and LOF(k)>1 is indicative of lower density than the neighbors, thus indicating a potential outlier. Depending on implementation, a normal datapoint may have LOF between 1 and 1.5 whereas anomalous observations may have a much higher LOF. Further, the higher the LOF value, the more likely it is an outlier. If the LOF of point X is 5, it means the average density of X's neighbors is 5 times higher than its local density. Skilled artisans will recognize that the foregoing LOF thresholds are purely illustrative and non-limiting, which may vary depending on the specific datasets and/or monitored systems. One advantage of LOF is its ability to handle datasets with varying densities and shapes and account for the local characteristics of the data. Additionally, LOF is computationally efficient and can be used for large datasets in some examples.

In some implementations, the IF technique may be deployed as an outlier detection method or module based on the scheme of isolating anomalies through successive binary tree partitioning. In one arrangement, the IF technique may be configured to randomly select a feature in the latent feature space and a random split value for that feature, and then perform a partitioning of the data based on whether the feature value is less than or greater than the split value. This process may be repeated recursively for a set number of iterations or until a specified threshold is reached, thereby resulting in a binary tree structure, where the datapoints that require fewer splits to isolate may be considered more likely to be outliers. To detect outliers, the IF technique may be configured to generate multiple trees and average the path lengths required to isolate each datapoint across all the trees. Datapoints that require shorter path lengths may be considered more likely to be outliers. One advantage of the IF technique is its ability to handle high-dimensional data and datasets with complex distributions, as it does not rely on the assumption of a specific data distribution. In some arrangements, the Isolation Forest for each compressed datapoint in the latent feature space in an example ADC engine implementation may be constructed based on mostly normal time series data. A contamination factor may be provided for quantifying the proportion of anomalies in the training dataset, which may be used to define a threshold on the path length scores of the samples.

Additional details regarding the foregoing outlier detection techniques may be found in the U.S. Provisional Patent Application No. 63/493,610, referenced and incorporated hereinabove. Details particularly relating to the LOF technique may be found in M. Breunig, et al., "LOF: identifying density-based local outliers," SIGMOD Rec. 29, 2 (June 2000), 93-104. https://doi.org/10.1145/335191.335388, incorporated by reference herein in its entirety. Details particularly relating to the IF technique may be found in F. T. Liu, et al., "Isolation Forest," 2008 Eighth IEEE International Conference on Data Mining, Pisa, Italy, 2008, pp. 413-422, doi: 10.1109/ICDM.2008.17, incorporated by reference herein in its entirety.

After the CAE engine is trained and configured (block 412) based on the appropriate input time series dataset associated with a monitored parameter or variable (with or without data preconditioning, data padding, preprocessing, etc.), the encoder portion having a fixed depth of the convolution layers, each with respective connection weights and biases that are learned through the training process, may be retained for mapping any candidate time series signals as noted previously. The reconstruction aspect of the engine facilitated by the decoder portion may be deployed for mapping back to the original time series signal after being classified as an anomalous signal in order to isolate specific regions or segments in the original time series signal that may be of concern.

Reference number 400B of FIG. 4B generally refers to a classification process or module of an ADC engine implementation wherein a candidate time series signal may be categorized as anomalous or non-anomalous according to some examples. Block 452 is illustrative of receiving or obtaining of a candidate time series signal, which may be preprocessed for quality verification in some arrangements. Further, the candidate time series signal may undergo optional DTW processing to obtain indexed alignment (block 454). The candidate time series signal is mapped using the trained encoder of the ADC engine to obtain a compressed representation in the latent feature space containing compressed representations of the training time series signals, wherein each compressed representation contains a plurality of compressed datapoints (block 456). A fitted POD engine, e.g., comprising a trained LOF and/or an IF module described above, may be applied to each compressed datapoint to predict or otherwise determine whether the compressed datapoint corresponding to the candidate time series signal is an outlier or inlier. In some arrangements, the POD engine may be fitted in a latent feature space using small segments or sets of datapoints rather than individual datapoints. In such an arrangement, outlier/inlier prediction may be performed over segments instead of pointwise detection, e.g., in a small segment outlier detection process. Without loss of generality, the fitted POD engines operable as part of a trained ADC engine of the present disclosure may refer to both pointwise as well as small segment outlier detection modules for purposes of some examples herein. Accordingly, block 458 may include an outlier detection process with respect to the compressed datapoints of the candidate time series signal involving pointwise and/or small segment outlier detection. Regardless of which outlier detection scheme is used, the number of outlier points or outlier segments may be counted, and suitable thresholds may be applied relative to the percentages, ratios, or portions of the outliers compared to the inliers of the compressed datapoints for classification. In some arrangements, the thresholds may be location-specific, as deviations in some portions of the time series signals may be more critical than others, thereby requiring stricter or tighter thresholds. If a ratio or other suitable quantity associated with the outlier points/segments in the compressed representation is greater than an applicable threshold, the candidate time series signal may be classified as anomalous (block 460). In some arrangements, multiple tiers of thresholds may be established to identify different levels of "anomalousness" of a candidate time series signal, wherein corresponding levels of alarm signals may be generated to trigger various types of escalatory disposition actions, e.g., depending on the criticality of the monitored parameter, amount of anomalousness of the candidate time series signal, etc., in a given application environment. It should be appreciated that the types of alarm signals, disposition action triggers, etc., that may be provided after anomaly detection and classification (block 462) may be highly implementation- and application-specific.

In some arrangements, for every (multidimensional or n-tuple) compressed datapoint in the latent feature space, an LOF score may be calculated and compared to the reference latent feature training dataset obtained in POD training. If the new datapoint has a LOF value above an LOF threshold, it may be considered an outlier, wherein different thresholds may be provided depending on the monitored system as previously set forth. In some arrangements, a compressed datapoint in the latent feature space may be classified using LOF score comparison relative to the compressed datapoint distributions obtained using the normal training dataset. In some arrangements, if the number of outlier points exceeds a threshold, the entire signal may be classified as anomalous. In some arrangements, the decoder portion of the trained CAE engine may be executed to map the points flagged as outliers in the latent feature space to the corresponding regions in the original candidate time series signal to facilitate fine-grain analysis of the time series signal.

In some additional and/or alternative arrangements, path lengths associated with each n-tuple datapoint in the latent feature space may be determined by applying a trained IF module. Appropriate path length thresholds may be used to classify a datapoint as an inlier or an outlier, as previously set forth. If the path length required to isolate a point across all the trees in the IF module is shorter than the threshold set with respect to the training dataset, the point may be classified as an outlier. As with the LOF-based scheme, if the number of outlier points in the latent feature space is greater than a set threshold (e.g., referred to herein as anomaly classifier thresholds), the entire candidate time series signal may be classified as anomalous. Again, the trained decoder may be configured to map the latent space outliers to one or more regions in the original candidate time series signal that may be flagged for further analysis. In some arrangements, outlier detections from the LOF and IF modules (e.g., based on respective outlier classifier thresholds) may be combined or considered in a cumulative/weighted manner to determine a final classification with respect to an example candidate time series signal.

Figure 5B:
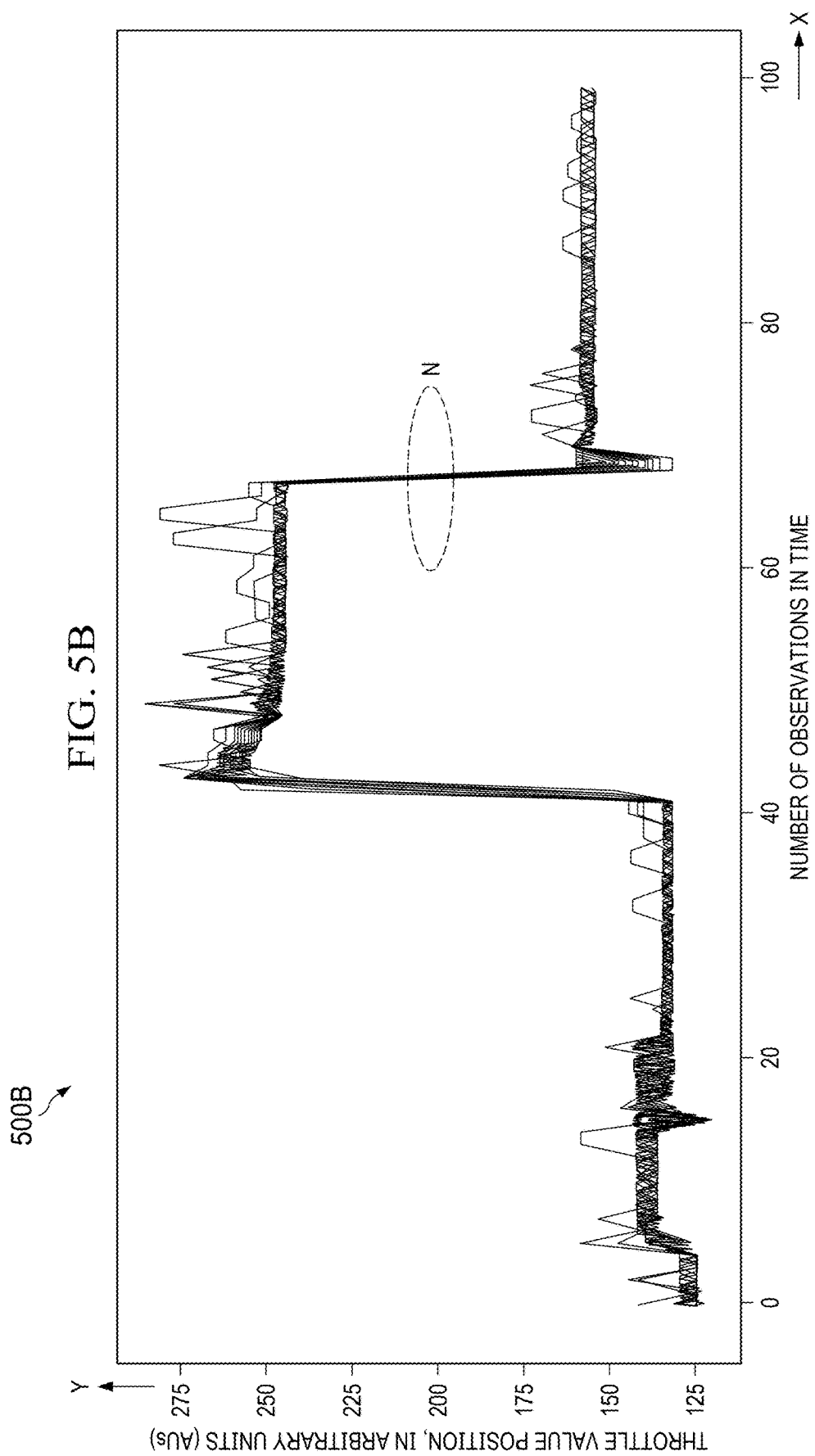
Figure 6A:
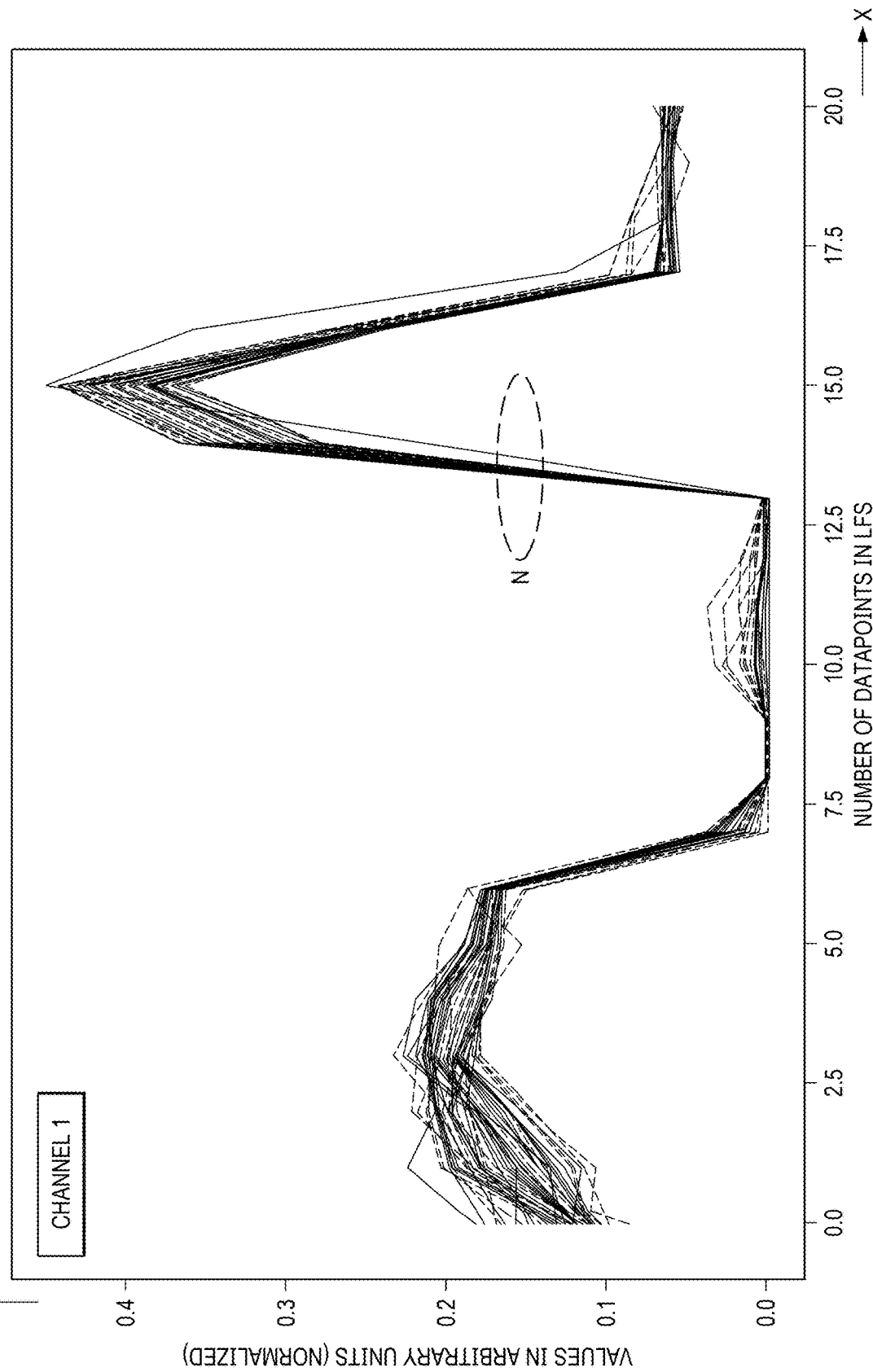
Figure 6C:
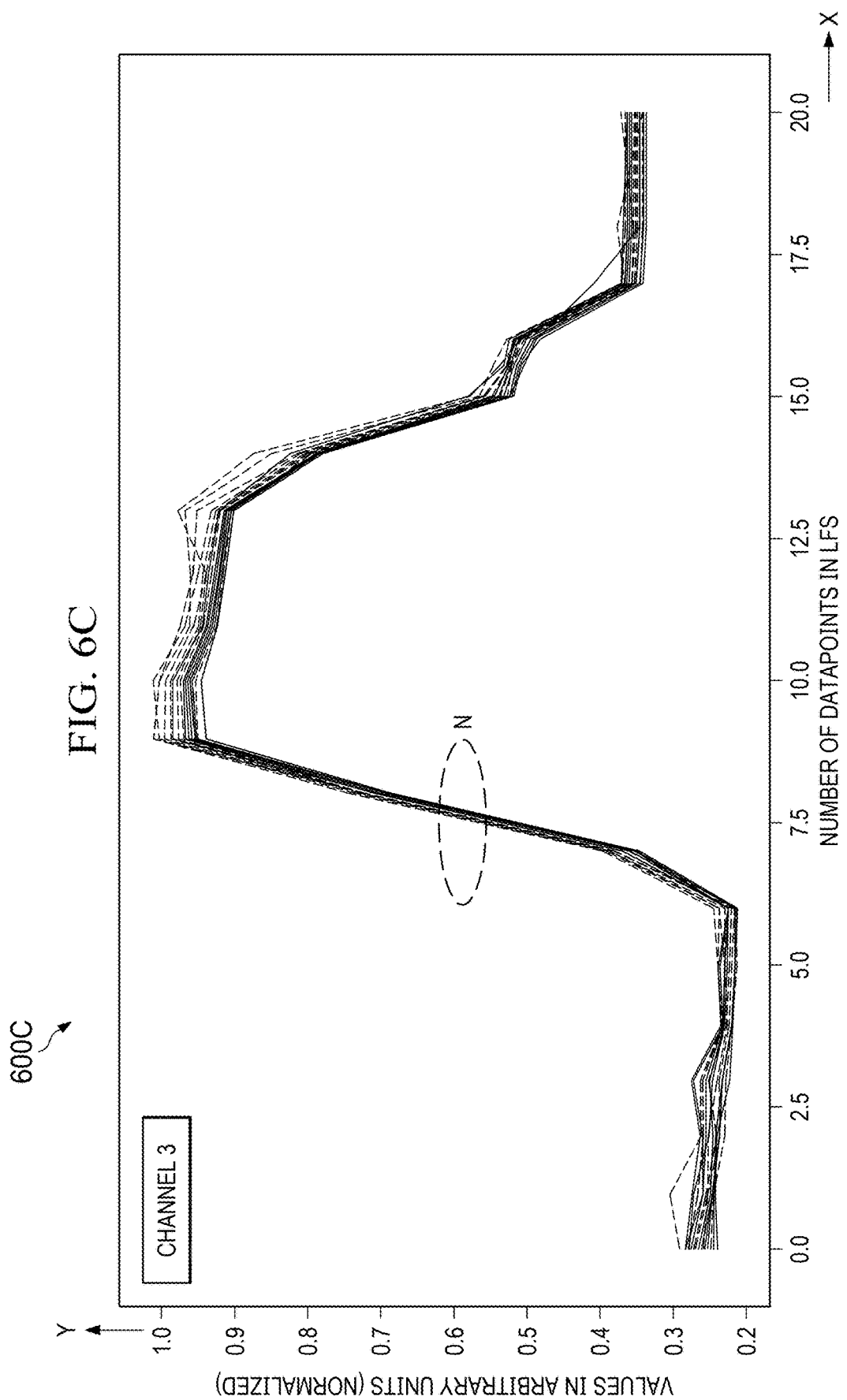
Figure 7A:
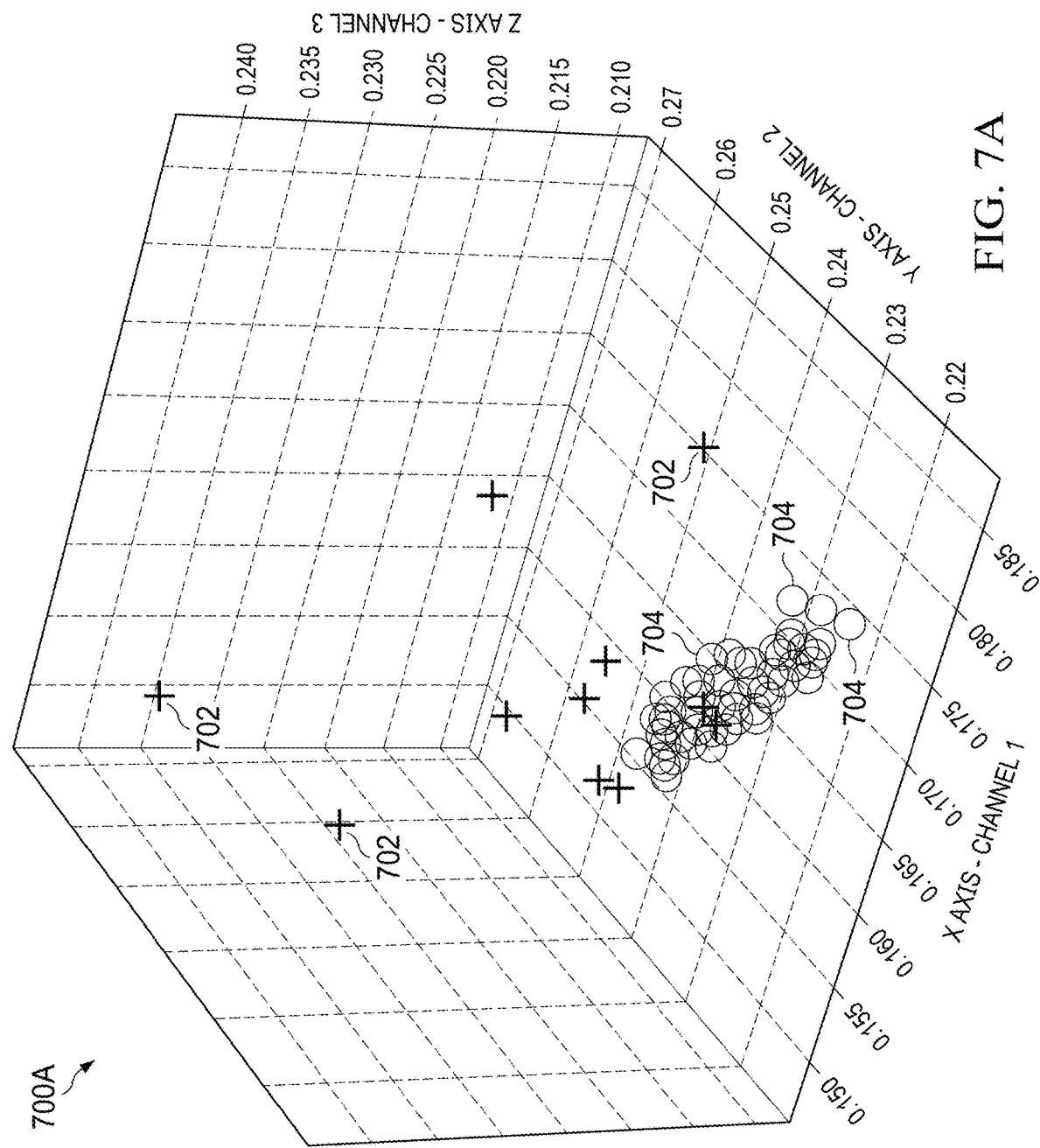
FIGS. 7A-7C depict distributions associated with three representative compressed datapoints, respectively, wherein each axis corresponds to a respective channel of the 3D-latent feature space corresponding to a particular compressed datapoint in an example implementation.
Figure 7B:
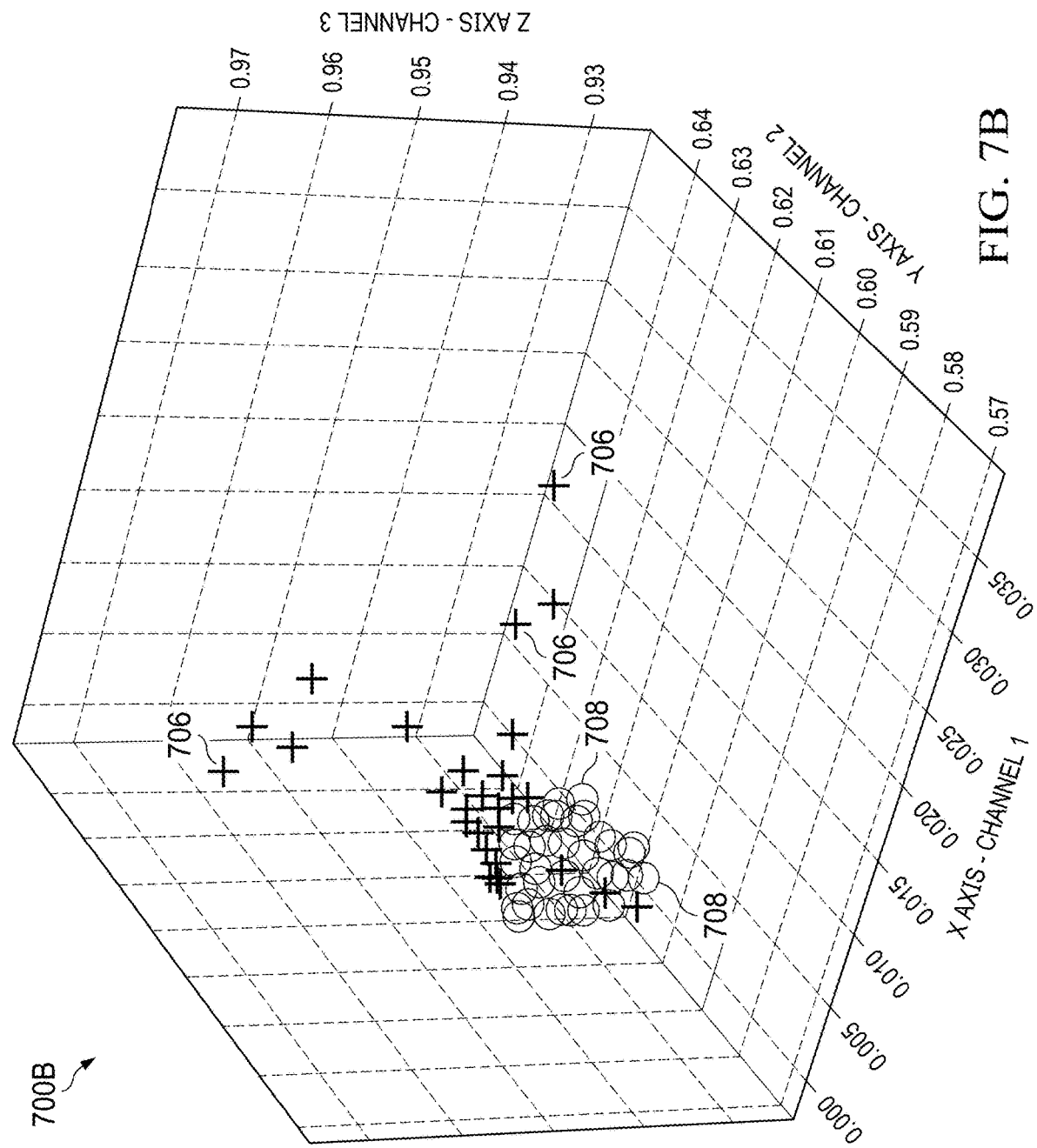
Figure 7C:
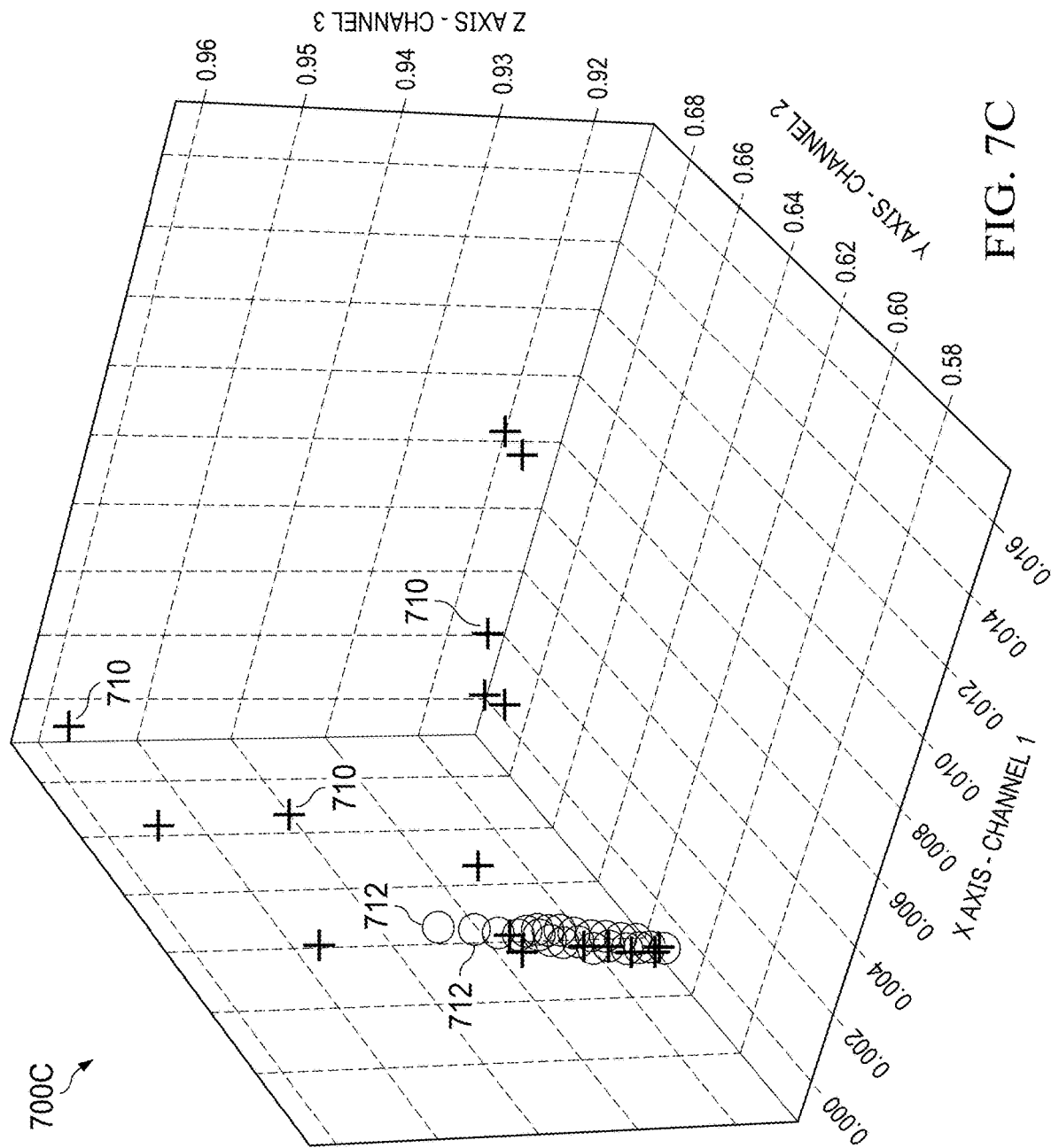

FIGS. 5A and 5B depict a plurality of time series signals relating to a tool setting, e.g., throttle valve position, of a plasma etch tool that may be analyzed for anomaly detection and classification using an ADC engine having a 3-channel latent feature space in an example application scenario. Reference number 500A in FIG. 5A generally refers to a plot of N observations or time series signals, wherein the observations each comprise a number (n) of time-indexed measurements or instances (shown along the X-axis) of the throttle valve position, e.g., normalized to some arbitrary units or no units (shown along the Y-axis). Reference number 500B in FIG. 5B generally refers to the same N observations after applying a DTW preprocessing technique to remove any translations in the time series data. An encoder portion of the ADC engine is operable to encode the N observations to N corresponding compressed code signatures or representations in the latent feature space spanned by three features that correspond to the three channels effectuated by a final convolutional layer of the encoder (e.g., convolution layer 362C of encoder 350 shown in FIG. 3B). By way of illustration, encoder 350 may be applied to encode each of N observations into a representation comprising a number (m) of compressed datapoints (e.g., 20) per channel, with m<n. Accordingly, each compressed datapoint comprises a 3-tuple or triplet in a 3D space where each coordinate or dimension is given by the value at the particular compressed datapoint for each channel. FIGS. 6A-6C depict compressed representations corresponding to the N observations "decomposed" into three channels, respectively. Reference number 600A in FIG. 6A generally refers to N compressed representations with respect to a first feature of the latent feature space, e.g., corresponding to Channel 1, wherein the number of compressed datapoints (1 to 20) is shown along the X-axis and normalized values associated with Channel 1 (corresponding to the first feature of the latent feature space), are shown along the Y-axis, which are abstract values in arbitrary or no units as previously noted. In similar fashion, reference numbers 600B and 600C in FIGS. 6B and 6C, respectively, generally refer to N compressed representations with respect to a second feature (corresponding to Channel 2) and a third feature (corresponding to Channel 3) of the 3D latent feature space. As each compressed datapoint has a triplet value {Channel 1; Channel 2; Channel 3} due to the three hidden features, and given that each of N observations is compressed to 20 compressed datapoints, the distributions of values of a compressed datapoint may be illustrated in a related 3D spatial transformation, wherein each axis of the space may correspond to a particular channel. Accordingly, for a 20-datapoint compression, an assemblage of 20 such 3D-spaces may be obtained, wherein each 3D-space corresponds to a particular one of the 20 compressed datapoints and depicts a distribution of N triplet values ({Channel 1; Channel 2; Channel 3}$_i$, i=1, 2, . . . , N) therein. For each compressed datapoint, a fitted POD engine may be applied over the distribution of N triplet values to determine inliers and outliers, e.g., based on applicable LOF and/or IF thresholds as noted previously. As examples, 3D-spaces corresponding to three compressed datapoints are shown in FIGS. 7A-7C, respectively, with each axis corresponding to a respective channel. Reference number 700A in FIG. 7A generally refers to a distribution of N values or points, each comprising a {Channel 1; Channel 2; Channel 3} triplet, with respect to the compressed datapoint [6], wherein Channel 1 values of the compressed datapoint [6] are shown along the X-axis, Channel 2 values of the compressed datapoint [6] are shown along the Y-axis and Channel 3 values of the compressed datapoint [6] are shown along the Z-axis. It should be recognized that the N triplet values for the compressed datapoint [6] may be observed from the individual channel plots 6A-6C, respectively, by locating the compressed datapoint [6] along the X-axis and obtaining the Y-intercept values (N values) at that location. Responsive to applying the POD engine, a triplet point of the distribution 700A may be categorized as an outlier or an inlier. By way of illustration, outlier points are shown as pluses [+] (e.g., as indicated by reference numbers 702) whereas inlier points are shown as open circles [O] (e.g., as indicated by reference numbers 704). In similar fashion, reference number 700B in FIG. 7B generally refers to a distribution of N triplet values corresponding to the compressed datapoint [11] and reference number 700C in FIG. 7C generally refers to a distribution of N triplet values corresponding to the compressed datapoint [12], wherein outlier points are shown as pluses [+] (e.g., as indicated by reference numbers 706, 710) and inlier points are shown as open circles [O] (e.g., as indicated by reference numbers 708, 712.

Figure 8:
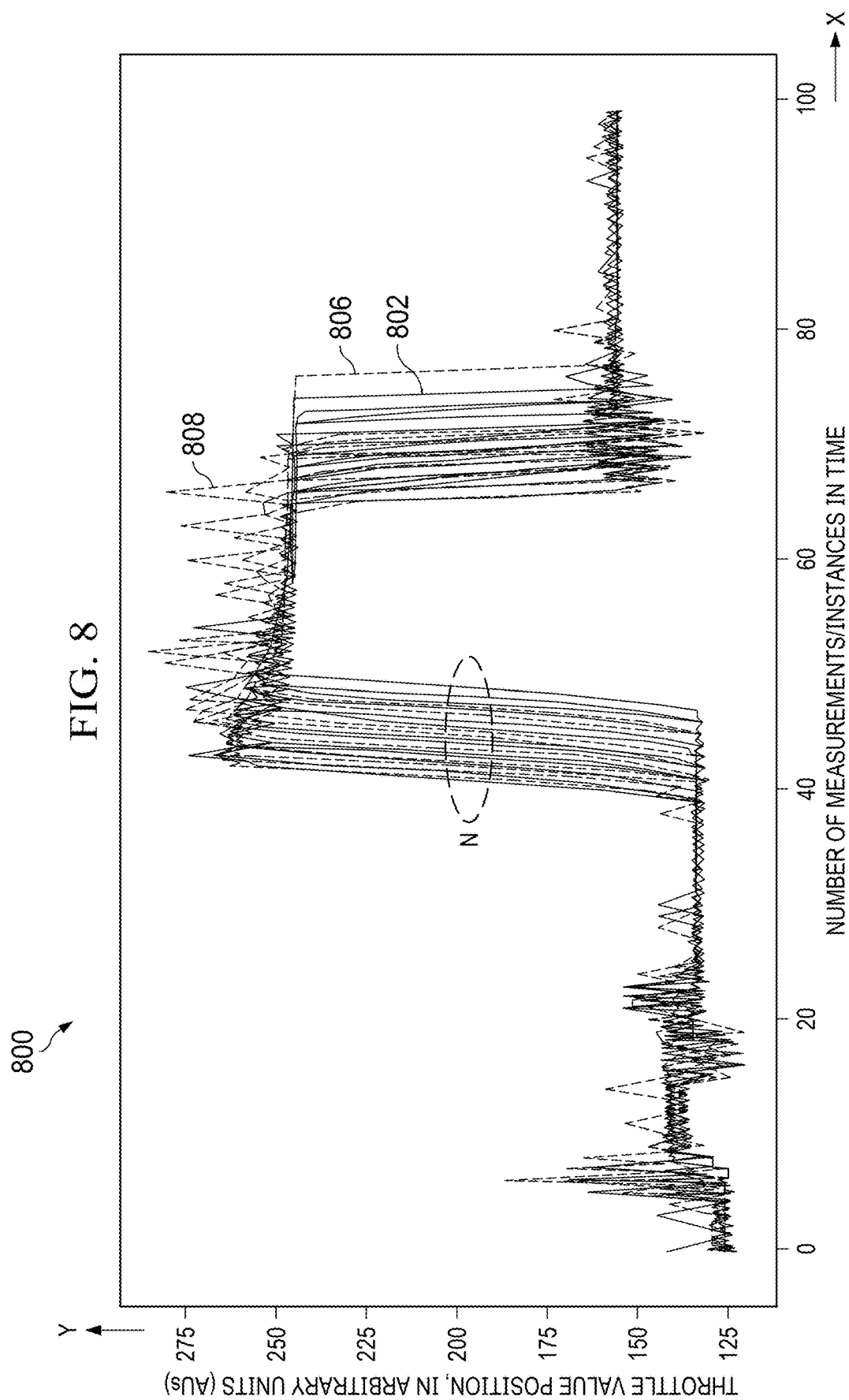
FIG. 8 depicts the plurality of time series observations of FIG. 5A wherein one or more time series observations are identified as anomalous based on a pointwise outlier detection process applied to the respective 3D-latent feature space distributions associated with the compressed datapoints.

FIG. 8 depicts the N observations of FIG. 5A wherein one or more observations are identified as anomalous based on a POD process applied to the respective 3D-space distributions associated with the compressed datapoints in the example set forth above. By way of illustration, observations with more than 15% outlier points in the latent feature space are classified as anomalous (i.e., if an observation has more than 3 compressed datapoints out of the 20 compressed datapoints that are categorized as outliers, that observation is classified as an anomalous signal). As illustrated, reference number 802 refers to a non-anomalous time series signal whereas reference numbers 806 and 808 refer to anomalous time series signals of the N original time series signals obtained with respect to the throttle valve position parameter of the monitored plasma etch tool in the example application scenario.

Figure 9:
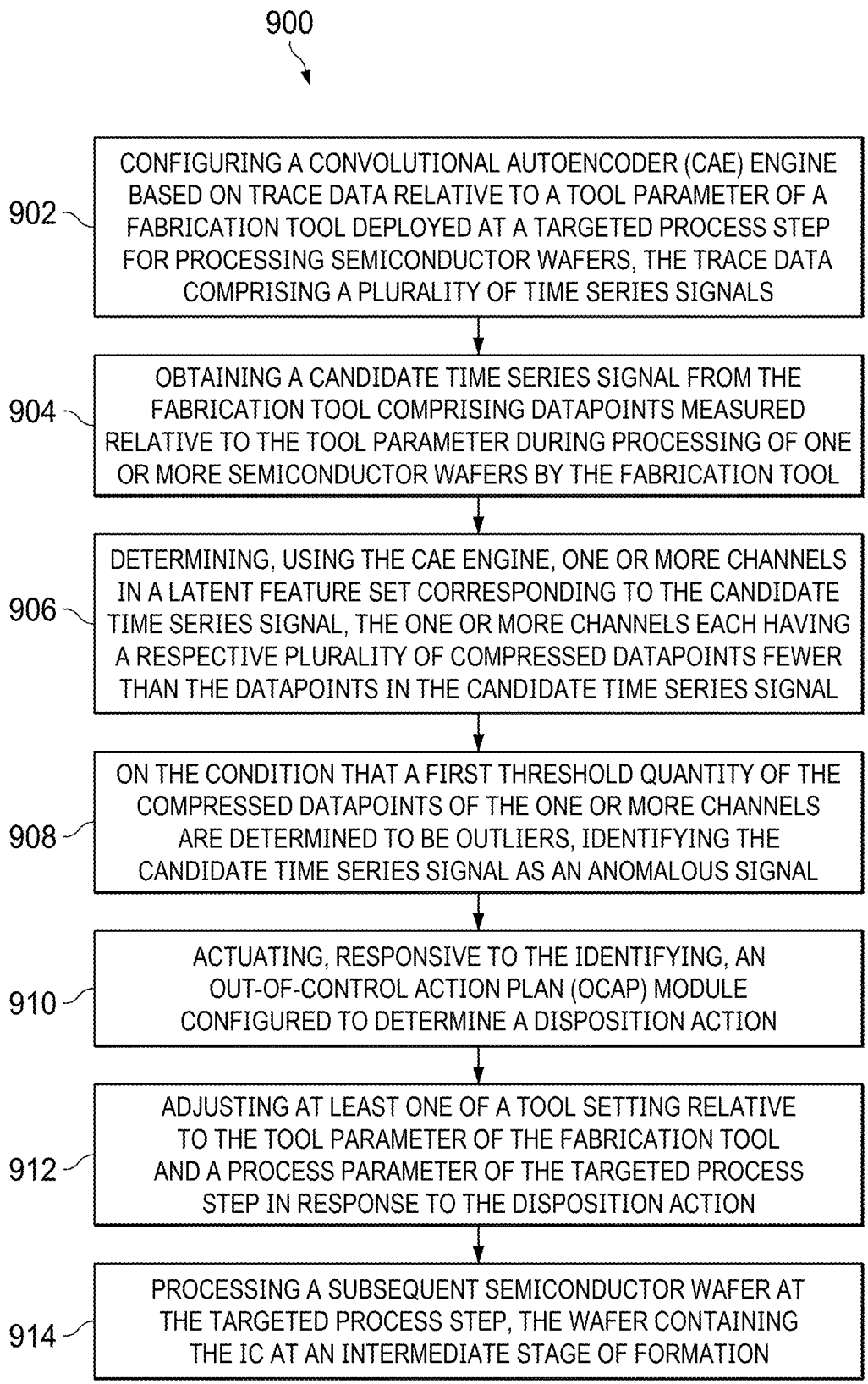
FIG. 9 is a flowchart of an IC fabrication method according to some examples of the present disclosure.

FIG. 9 is a flowchart of a method of fabricating an IC according to some examples of the present disclosure. Method 900 may involve configuring a CAE engine based on trace data relative to a tool parameter of a fabrication tool deployed at a targeted process step for processing semiconductor wafers (block 902). As previously set forth, the trace data may comprise a plurality of time series signals associated with the tool parameter that may be appropriately preprocessed, conditioned and/or otherwise treated for ensuring data quality in order to facilitate a robust training phase as part of configuring the CAE engine. At block 904, a candidate time series signal may be obtained from the fabrication tool relative to the tool parameter over a suitable time period, e.g., during processing of one or more semiconductor wafers by the fabrication tool. In some arrangements, the candidate time series signal may be preprocessed for quality and/or index alignment. At block 906, one or more channels in a latent feature space corresponding to the candidate time series signal may be determined using the CAE engine, e.g., by executing a trained encoder portion of the CAE engine, wherein the one or more channels each have a plurality of compressed datapoints fewer than the datapoints in the candidate time series signal. Thereafter, on the condition that a portion of or a quantity associated with the compressed datapoints in the latent feature space determined to be outliers is greater than a first threshold (e.g., a first level anomaly classifier), the candidate time series signal may be identified, classified or otherwise categorized as an anomalous signal (block 908). At block 910, an OCAP module may be actuated responsive to identifying the candidate time series signal is an anomalous signal. As previously set forth, the OCAP module may be configured to determine a variety of disposition actions depending on implementation. In some arrangements, at least one of a tool setting relative to the tool parameter of the fabrication tool, one or more process parameter(s) of the targeted process step, or a combination thereof, may be adjusted in response to the disposition action (block 912). In some arrangements, a subsequent semiconductor wafer may be processed at the targeted process step using adjusted process parameter(s) and/or tool setting parameter(s), wherein the subsequent semiconductor wafer contains an IC at an intermediate stage of formation (block 914). In some arrangements, example method 900 may be modified to include a second threshold (e.g., a second level anomaly classifier) that may be greater than the first threshold established with respect to the outliers. On the condition that an outlier portion of the compressed datapoints in the latent feature space is greater than the second threshold, a disposition action may involve servicing or repairing the fabrication tool or an affected component thereof prior to processing the subsequent semiconductor wafer(s). In some arrangements, the training trace datasets as well as candidate time series signals may be collected on a wafer-by-wafer basis, lot-by-lot basis or on per-process run basis, depending on implementation.

In addition to semiconductor fabrication, various disclosed methods and systems of the present disclosure may be beneficially applied to other manufacturing processes and application environments wherein time series signals of various types may be analyzed and characterized for potential fault detection and action plan generation. Responsive to real-time or near real-time action plan triggers and alarms, various factory-specific and industry-specific predetermined disposition mechanisms, etc., may be implemented in a configurable manner such that the effects of stochastic/transitional events in a manufacturing environment can be isolated in an autonomous or semi-autonomous manner according to some examples herein. Further, any deleterious effects of potential anomalous time series signals may be prophylactically prevented or other otherwise minimized before such effects can cause significant deviation in end-product quality, reliability, performance, etc.

It should be further appreciated that a representative system monitored and managed according to some examples herein may comprise any system that produces time series data, including physical systems such as manufacturing equipment as previously noted, as well as electronic systems such as computers and other devices, software systems such as operating systems, among others. In further arrangements, sensor data from one or more sensors disposed in a sensor network or other otherwise disposed in an application environment may be collected to record the state of an example monitored system. Example sensors can be any appropriate sensor including physical sensors such as electric field, magnetic field, temperature, pressure, voltage, current, fluid flow, humidity, etc. In computer systems, software systems and other related application environments, time series data logged to describe the state of the system, e.g., relating to execution times, CPU Utilization, memory usage, batch data write times, queue size, etc., may also be monitored and characterized according to some examples herein.

One or more examples of the present disclosure may be implemented using different combinations of software, firmware, and/or hardware. Thus, one or more of the techniques shown in the Figures (e.g., flowcharts) may be implemented using code and data stored and executed on one or more electronic devices or nodes (e.g., a workstation, a network element, etc.). Such electronic devices may store and communicate (internally and/or with other electronic devices over a network) code and data using computer-readable media, such as non-transitory computer-readable storage media (e.g., magnetic disks, optical disks, random access memory, read-only memory, flash memory devices, phase-change memory, etc.), transitory computer-readable transmission media (e.g., electrical, optical, acoustical or other form of propagated signals—such as carrier waves, infrared signals, digital signals), etc. In addition, some network elements or workstations, e.g., configured as servers, may typically include a set of one or more processors coupled to one or more other components, such as one or more storage devices (e.g., non-transitory or persistent machine-readable storage media) as well as storage database(s), user input/output devices (e.g., a keyboard, a touch screen, a pointing device, one or more imaging capturing devices and/or a display, etc.), and network connections for effectuating signaling and/or data transmission. The coupling of the set of processors and other components may be typically through one or more buses and bridges (also termed as bus controllers), arranged in any known (e.g., symmetric/shared multiprocessing) or heretofore unknown architectures. Thus, the storage device or component of a given electronic device or network element may be configured to store program code and/or data for execution on one or more processors of that element, node or electronic device for purposes of implementing one or more techniques of the present disclosure.

At least some examples are described herein with reference to one or more system diagrams/schematics, block diagrams and/or flowchart illustrations. It is understood that such diagrams and/or flowchart illustrations, and combinations of blocks in the block diagrams and/or flowchart illustrations, can be implemented by any appropriate circuitry configured to achieve the desired functionalities. Accordingly, some examples of the present disclosure may be embodied in hardware and/or in software (including firmware, resident software, micro-code, etc.) operating in conjunction with suitable processing units or microcontrollers, which may collectively be referred to as "circuitry," "a module" or variants thereof. An example processing unit or a module may include, by way of illustration, a general purpose processor, a special purpose processor, a conventional processor, a digital signal processor (DSP), an image processing engine or unit, a plurality of microprocessors, one or more microprocessors in association with a DSP core, a controller, a microcontroller, Application Specific Integrated Circuits (ASICs), Field Programmable Gate Array (FPGA) circuits, any other type of integrated circuit (IC), and/or a state machine, as well as programmable system devices (PSDs) employing system-on-chip (SoC) architectures that combine memory functions with programmable logic on a chip that is designed to work with a standard microcontroller. Example memory modules or storage circuitry may include volatile and/or non-volatile memories such as, e.g., random access memory (RAM), electrically erasable/programmable read-only memories (EEPROMs) or UV-EPROMS, one-time programmable (OTP) memories, Flash memories, static RAM (SRAM), etc.

Further, in at least some additional or alternative implementations, the functions/acts described in the blocks may occur out of the order shown in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Also, some blocks in the flowcharts may be optionally omitted. Furthermore, although some of the diagrams include arrows on communication paths to show a primary direction of communication, it is to be understood that communication may occur in the opposite direction relative to the depicted arrows. Finally, other blocks may be added/inserted between the blocks that are illustrated.

It should therefore be clearly understood that the order or sequence of the acts, steps, functions, components or blocks illustrated in any of the flowcharts and/or block diagrams depicted in the drawing Figures of the present disclosure may be modified, altered, replaced, customized or otherwise rearranged within a particular flowchart or block diagram, including deletion or omission of a particular act, step, function, component or block. Moreover, the acts, steps, functions, components or blocks illustrated in a particular flowchart may be inter-mixed or otherwise inter-arranged or rearranged with the acts, steps, functions, components or blocks illustrated in another flowchart in order to effectuate additional variations, modifications and configurations with respect to one or more processes for purposes of practicing the teachings of the present disclosure.

Although various implementations have been shown and described in detail, the claims are not limited to any particular implementation or example. None of the above Detailed Description should be read as implying that any particular component, element, step, act, or function is essential such that it must be included in the scope of the claims. Where the phrases such as "at least one of A and B" or phrases of similar import are recited or described, such a phrase should be understood to mean "only A, only B, or both A and B." Reference to an element in the singular is not intended to mean "one and only one" unless explicitly so stated, but rather "one or more." All structural and functional equivalents to the elements of the above-described implementations that are known to those of ordinary skill in the art are expressly incorporated herein by reference and are intended to be encompassed by the claims appended below.

What is claimed is:

1. A method of fabricating an integrated circuit (IC), the method comprising:
   configuring a convolutional autoencoder (CAE) engine based on trace data relative to a tool parameter of a fabrication tool deployed at a targeted process step for processing semiconductor wafers, the trace data comprising a plurality of time series signals associated with the tool parameter;
   obtaining a candidate time series signal from the fabrication tool comprising datapoints measured relative to the tool parameter during processing of at least one semiconductor wafer by the fabrication tool;
   determining, using the CAE engine, one or more channels in a latent feature space corresponding to the candidate time series signal, the one or more channels each having a plurality of compressed datapoints fewer than the datapoints in the candidate time series signal;
   on the condition that a quantity associated with the compressed datapoints in the latent feature space determined to be outliers is greater than a first threshold, identifying the candidate time series signal as an anomalous signal;
   actuating, responsive to the identifying, an out-of-control action plan (OCAP) module configured to determine a disposition action;
   adjusting at least one of a tool setting relative to the tool parameter of the fabrication tool and a process parameter of the targeted process step in response to the disposition action; and
   processing a subsequent semiconductor wafer at the targeted process step, the subsequent semiconductor wafer containing the IC at an intermediate stage of formation.

2. The method as recited in claim 1, wherein a compressed datapoint is determined to be an outlier based on a pointwise outlier detection (POD) engine fitted to the plurality of time series signals compressed in the latent feature space.

3. The method as recited in claim 1, further comprising preprocessing the plurality of time series signals and the candidate time series signal to obtain alignment of the time series signals based on an index before processing by the CAE engine.

4. The method as recited in claim 1, further comprising:
   configuring a second threshold with respect to the compressed datapoints, the second threshold greater than the first threshold; and
   on the condition that the quantity of the compressed datapoints in the latent feature space determined to be outliers is greater than the second threshold, servicing the fabrication tool prior to processing the subsequent semiconductor wafer.

5. The method as recited in claim 1, wherein the at least one semiconductor wafer and the subsequent semiconductor wafer are obtained from a single wafer lot.

6. The method as recited in claim 1, wherein the at least one semiconductor wafer and the subsequent semiconductor wafer are obtained from different wafer lots.

7. The method as recited in claim 1, wherein the disposition action is dependent upon the quantity of the compressed datapoints determined to be outliers and a relative importance of the tool parameter with respect to the targeted process step.

8. A semiconductor fabrication tool, comprising:
a manufacturing stage configured to receive an integrated circuit at an intermediate stage of formation; and
an anomaly detection and classification (ADC) module coupled to the manufacturing stage, the ADC module including a processor and a persistent memory having executable program instructions configured to perform following acts when executed by the processor:
training a convolutional autoencoder (CAE) engine based on trace data relative to a tool parameter of the semiconductor fabrication tool, the trace data comprising a plurality of time series signals associated with the tool parameter, the CAE engine including a latent feature space corresponding to compressed representation of the trace data;
training a pointwise outlier detection (POD) module fitted to the latent feature space; and
classifying a candidate time series signal operable to be generated by the fabrication tool as an anomalous signal responsive to an outlier determination from the POD module with respect to the candidate time series signal.

9. The semiconductor fabrication tool as recited in claim 8, further comprising a data preprocessing module configured to remove translations in the trace data and the candidate time series signal.

10. The semiconductor fabrication tool as recited in claim 8, further comprising an input data quality module configured to ensure quality of the trace data and the candidate time series signal.

11. The semiconductor fabrication tool as recited in claim 8, wherein the POD module comprises a Local Outlier Factor (LOF) module.

12. The semiconductor fabrication tool as recited in claim 8, wherein the POD module comprises an Isolation Forest (IF) module.

13. The semiconductor fabrication tool as recited in claim 8, further comprising an alarm generator for triggering an out-of-control action plan (OCAP) module in response to identifying the anomalous signal.

14. The semiconductor fabrication tool as recited in claim 8, wherein the program instructions further comprise instructions configured to classify the candidate time series signal at different levels of anomalousness based on a plurality of thresholds.

15. The semiconductor fabrication tool as recited in claim 8, wherein the manufacturing stage is configured to facilitate one of etch operations, deposition operations, implant operations, wafer clean operations, thermal treatment operations, and wafer polishing operations.

16. The semiconductor fabrication tool as recited in claim 8, further comprising at least one sensor selected from one or more position sensors, pressure sensors, thermal sensors, optical sensors, chemical sensors, motion sensors, level sensors, proximity sensors, and humidity sensors.

17. The semiconductor fabrication tool as recited in claim 8, wherein the manufacturing stage includes a process chamber configured to add to or subtract from a material layer of the integrated circuit.

18. An integrated circuit (IC), comprising:
a material layer formed over a semiconductor wafer at a targeted process step of a fabrication flow using a fabrication tool, the semiconductor wafer forming a substrate for the IC; and
the material layer reworked responsive to determining that a candidate time series signal associated with the fabrication tool is identified as an anomalous signal by a trained convolutional autoencoder (CAE) module coupled to a pointwise outlier detector that is fitted to a latent feature space associated with the trained CAE module, the candidate time series signal comprising trace data from the fabrication tool obtained during processing of the semiconductor wafer.

* * * * *